US008228193B1

(12) United States Patent
Tümer

(10) Patent No.: US 8,228,193 B1
(45) Date of Patent: Jul. 24, 2012

(54) TAG HAVING A SEMICONDUCTOR CHIP AND METHOD OF ATTACHMENT TO ARTICLE

(76) Inventor: Tümay O. Tümer, Riverside, CA (US)

(*) Notice: Subject to any disclaimer, the term of this patent is extended or adjusted under 35 U.S.C. 154(b) by 0 days.

(21) Appl. No.: 09/396,352

(22) Filed: Sep. 14, 1999

Related U.S. Application Data

(60) Provisional application No. 60/100,101, filed on Sep. 14, 1998.

(51) Int. Cl.
*G08B 13/14* (2006.01)
(52) U.S. Cl. ............... 340/572.1; 340/572.4; 340/572.7; 340/593.1; 340/5.61; 340/10.34; 342/27; 342/44; 342/51
(58) Field of Classification Search ............... 340/572.1, 340/572.4, 693.1, 5.61, 10.34, 10.4, 13.68, 340/572.5, 825.54, 572.7–572.9; 342/27, 342/44, 51, 42
See application file for complete search history.

(56) References Cited

U.S. PATENT DOCUMENTS

| | | | | | |
|---|---|---|---|---|---|
| 4,857,893 A | * | 8/1989 | Carroll | ...................... | 340/572.7 |
| 5,105,190 A | * | 4/1992 | Kip et al. | ................... | 340/10.34 |
| 5,153,583 A | * | 10/1992 | Murdoch | ................... | 340/10.34 |
| 5,272,117 A | * | 12/1993 | Roth et al. | ...................... | 438/14 |
| 5,374,930 A | * | 12/1994 | Schuermann | ................... | 342/42 |
| 5,446,447 A | * | 8/1995 | Carney et al. | ............... | 340/572.4 |
| 5,515,053 A | * | 5/1996 | Hecht et al. | ...................... | 342/42 |
| 5,528,222 A | * | 6/1996 | Moskowitz et al. | ........ | 340/572.7 |
| 5,541,604 A | * | 7/1996 | Meier | .............................. | 342/42 |
| 5,731,754 A | * | 3/1998 | Lee, Jr. et al. | ................. | 340/447 |
| 5,748,106 A | * | 5/1998 | Schoenian et al. | ............ | 340/928 |
| 5,779,839 A | * | 7/1998 | Tuttle et al. | .................... | 156/213 |
| 5,793,305 A | * | 8/1998 | Turner et al. | ................ | 340/10.34 |
| 5,842,118 A | * | 11/1998 | Wood, Jr. | ...................... | 455/101 |
| 5,963,134 A | * | 10/1999 | Bowers et al. | ............. | 340/572.1 |
| 5,966,082 A | * | 10/1999 | Cofino et al. | ............ | 340/825.54 |
| 5,973,598 A | * | 10/1999 | Beigel | ......................... | 340/572.1 |
| 6,002,343 A | * | 12/1999 | Auerbach et al. | .......... | 340/10.41 |
| 6,031,459 A | * | 2/2000 | Lake | ............................. | 340/572.8 |
| 6,054,925 A | * | 4/2000 | Proctor et al. | ............. | 340/572.7 |
| 6,136,274 A | * | 10/2000 | Nova et al. | ..................... | 422/101 |
| 6,154,137 A | * | 11/2000 | Goff et al. | .................. | 340/572.4 |
| 6,329,139 B1 | * | 12/2001 | Nova et al. | ..................... | 209/597 |

OTHER PUBLICATIONS

"RFID Tags Shrink and Gain Flexibility," *EDN Magazine*, Jun. 19, 1997, p. 18.

* cited by examiner

*Primary Examiner* — Tai T Nguyen
(74) *Attorney, Agent, or Firm* — Mark Rodgers

(57) ABSTRACT

An application specific integrated circuit chip includes capacitors and antennas. The antennas receive energy from an outside source, and charge capacitors on the chip in order to provide power to the chip itself. The chip in turn communicates by antenna to outside receivers for the purposes of identification of the chip and hence a bag or article to which it is attached. The chip is attached to its article by means of glue which is in turn applied by an applicator which shoots the chip and the glue against the article.

73 Claims, 20 Drawing Sheets

TAG HAVING A SEMICONDUCTOR CHIP AND METHOD OF ATTACHMENT TO ARTICLE

CROSS REFERENCE TO PROVISIONAL PATENT APPLICATION

This application claims the benefit of the filing date of pending U.S. Provisional Application No. 60/100,101, filed on Sep. 14, 1998, the respective disclosure of which is incorporated herein by reference.

BACKGROUND

1. Field of the Invention

Smart tags are presently used for a number of applications in both the civilian and military sectors. These applications include item identification, toll passes, and barrier tagging. These tags are relatively expensive, costing several dollars, and are limited in the amount of information they can store. These tags cannot be used in large quantities, because of the cost involved, especially in circumstances where they can not be recovered for reapplication.

Both military and civilian sectors require low cost tags costing few cents each for many different applications especially for use in large quantities where tag recovery is impractical. Some applications for Government use include tagging individual weapons, munitions or pieces of equipment, crates, and other inventory. Some civilian applications include tagging baggage in airports, parcels, packages, crates, individual items, files, folders, and dockets, inventory, shop merchandise, and for employee and vehicle identification.

Tagging baggage at airports is an important application. It will be beneficial to have a smart baggage tagging system which can store detailed information. This will allow to track the history of baggage: point of origin, travel route, and a profile of the owner. Such information will require significant amount of non-volatile memory.

The size of the tag is also important so that it can be placed onto baggage and cargo inconspicuously. Therefore, the size of the tag should be smaller than about $5\times5\times0.3$ mm$^3$.

The tag should not require any external power or antenna. Even a tiny battery or a small antenna will increase the size and complexity due to the connection of the battery and/or the antenna to the chip; at the same time tag's cost increases dramatically. A battery has a finite lifetime and the probability of failure during application is greater. A tag with the required power generated on board by the remote programmer/reader would be a better solution for accommodating power needs.

Development of such a smart tag requires a suitable applicator. The applicator must be simple in design and cost-effective. The applicator must be able to apply the smart tag onto any type of package, bag, box, luggage, and crate of various thickness and stiffness while they are transported on a conveyor. The applicator must apply the tag onto the baggage item as it is moving with arbitrary order, shape, size, orientation, and position. It must work fast, as the conveyor can reach a maximum speed of one meter per second with about one meter spacing between each item. The tag must adhere easily to different kinds of luggage material such as, cloth, metal, plastic, paper, leather or wood.

2. Description of Related Art

FIG. 1 shows the reproduction of an article in EDN magazine (Jun. 19, 1997) that presents recent progress in the area of radio-frequency identification RFID) tag chips. The size of the tags shown is $61\times10\times0.1$ mm$^3$ ($610$ mm$^2$ area), which obviously makes them too large for the kind of automatic application of this disclosed invention. In the case of SCS Corp.'s tag chip shown in FIG. 1, the size of the RF antenna needed for the communication between tag chip and remote programmer/reader places a limit on the reduction in size that can be achieved. By using higher frequencies and carefully investigating of the antenna design, this limitation of the prior art. The size of the applicant's MicroTAG chip is 16 mm$^2$ (future versions are expected to be 9 mm$^2$) which is nearly 40 times (or $\geqq 68$ times) smaller than the SCS Corp. tag chip. The SCS chip also requires mounting the antenna onto the chip where applicant's MicroTAG chip has both the transmission and receiving antennas on chip and does not require any mounting.

BRIEF SUMMARY OF THE INVENTION

A practical low-cost smart tag and a novel applicator are disclosed. A tag applicator system is required for mounting tags onto baggage scanned by a scanner system. A glue based system is used where the tag chip is embedded inside a drop of molten glue and propelled onto the baggage using air pressure. The glue used is a new type that has good adhesion but stays reasonably soft and does not affect the surface it is applied to. The resulting glue-chip pellets are small, transparent, and inconspicuous.

The tag chip and the tag applicator can be used for numerous other applications. Especially the tag chip is designed to be versatile and the commercial application possibilities are endless.

A practical smart tag (MicroTAG) chip built on a tiny silicon die has been designed, simulated, and fabricated. The size of the MicroTAG chip developed is $4\times4\times0.3$ mm$^3$. The MicroTAG chip is designed to be completely self-contained. It contains two antennas placed on opposite sides of the chip (FIGS. 9 to 11). One of them receives the microwave signal from the interrogator which is used both to power the chip by storing charge onto a large on-chip capacitance bank and to transmit data to the chip. The second antenna is used to transmit the chip's response to any data requests from the interrogator. Rather than using an active transmitter (which would require a large amount of power) for this purpose, this antenna is set up to reflect a continuous wave from the interrogator with varying efficiency; the data from the chip is encoded in the pattern of the efficiency variation. For details of this "modulated backscatter" design see the discussion given below. Spread-spectrum techniques may be added to increase the noise immunity of the system.

A computer aided design (CAD) program developed for modeling and simulating electromagnetic devices has been used. This program is especially useful to design and simulate the receiving and transmission antennas. In this work the spacing and thickness of the antenna metal can be optimized for application to the proposed MicroTAG chip. For example, the present prototype has been designed for 10 GHz where the microwave skin depth is about 0.8 micrometers to achieve low resistivity. The skin depth is the distance the microwave currents penetrate into the surface of the metal layer. It is within this characteristic depth that the electromagnetic field propagates. This skin depth varies with the frequency and dielectric constant of the surrounding media. The test results from the first version can be used to fully optimize the MicroTAG chip design.

DETAILED DESCRIPTION OF THE INVENTION

Figure 2:
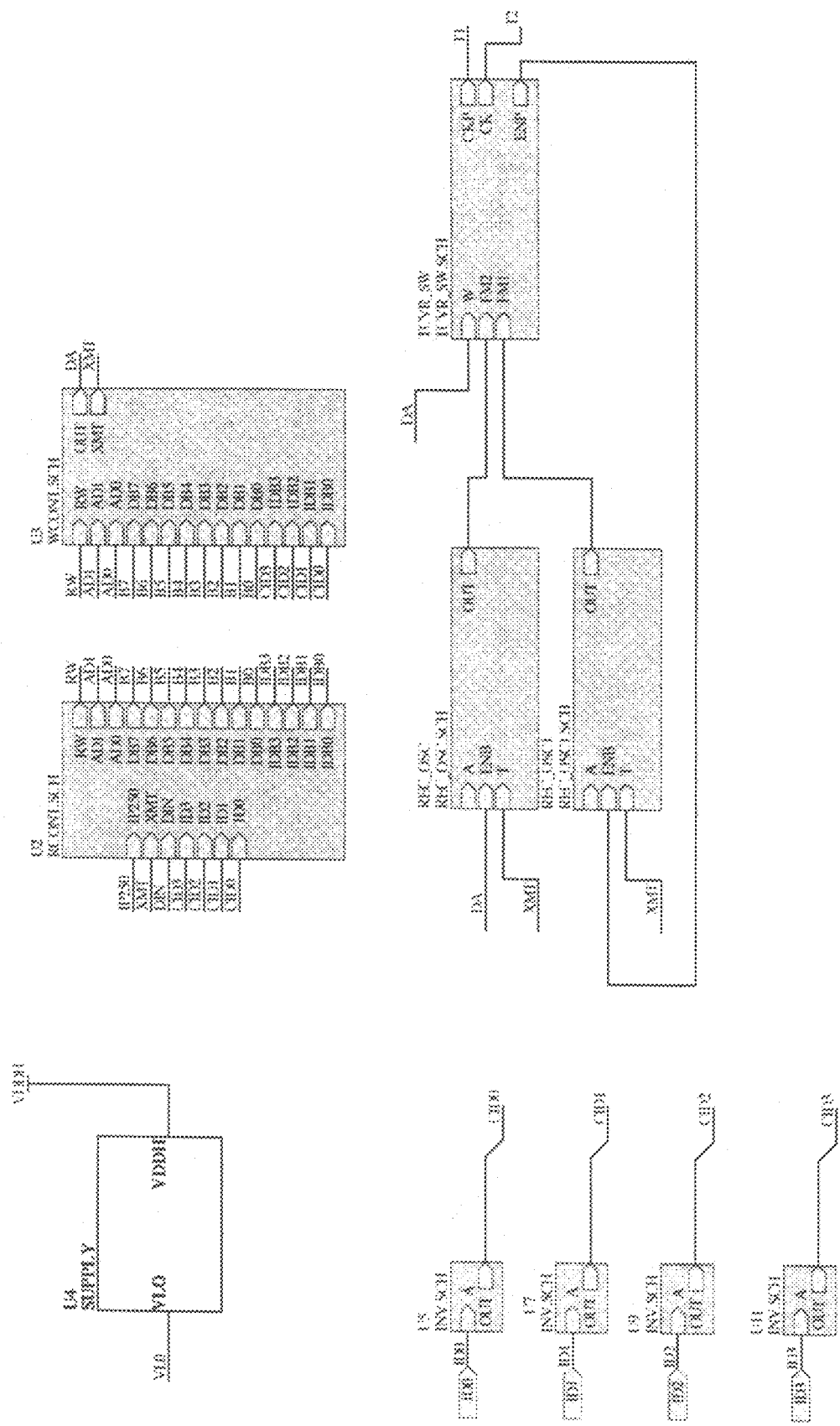
FIG. 2 shows a top level schematic layout of applicant's MicroTAG chip.

The top level schematic diagram of the MicroTAG chip is shown in FIG. 2. For this version, it consists of four sections: The left block is the power supply (SUPPLY), the middle block is the read-in and memory section (RCONT), and the right block is the transmit section (WCONT). The lower right blocks are the oscillators that modulate the backscatter transmitter.

The chip is powered by charging a capacitor array, either via microwaves sent from the stationary transceiver that will be part of the MicroTAG system, or through a pad on the chip. For diagnostic purposes, the pad can be activated and deactivated by a gate that is controlled via a second pad. The charge state of the capacitor array is output through a source follower, again for test purposes. Of course, this source follower is powered separately from the main chip circuits, as are all other diagnostic circuits, to avoid any interference with the chip tests.

The four chip ID inputs are shown in the lower left. The ID codes can be fixed in metal or programmed onto suitable ROM circuitry for various versions of the die. For the first test version, an external, programmable capability was to aid diagnostics. These four ID bits are programmed by the off chip control to be any value. 16 codes are possible for this version. A default code is generated by pull-up and pull-down resistors on the ID inputs. Other pads on the chip allow access information from various stages of the data processing on the chip. For example, when transmitting data to the chip, one can bypass the antenna and directly send the data to a serial input pad instead, freeing applicant from the need to worry about the actual microwave transmission at this stage. Also, one can examine whether the information written to the latch registers (see the discussion below) and the memory agrees with the data transmitted through the serial input. The relevant pads are set up as bidirectional pads to allow both read and write access. This enables one to test parts of the circuit even if other parts that come earlier in the data processing sequence turn out not to work as intended.

Figure 3:
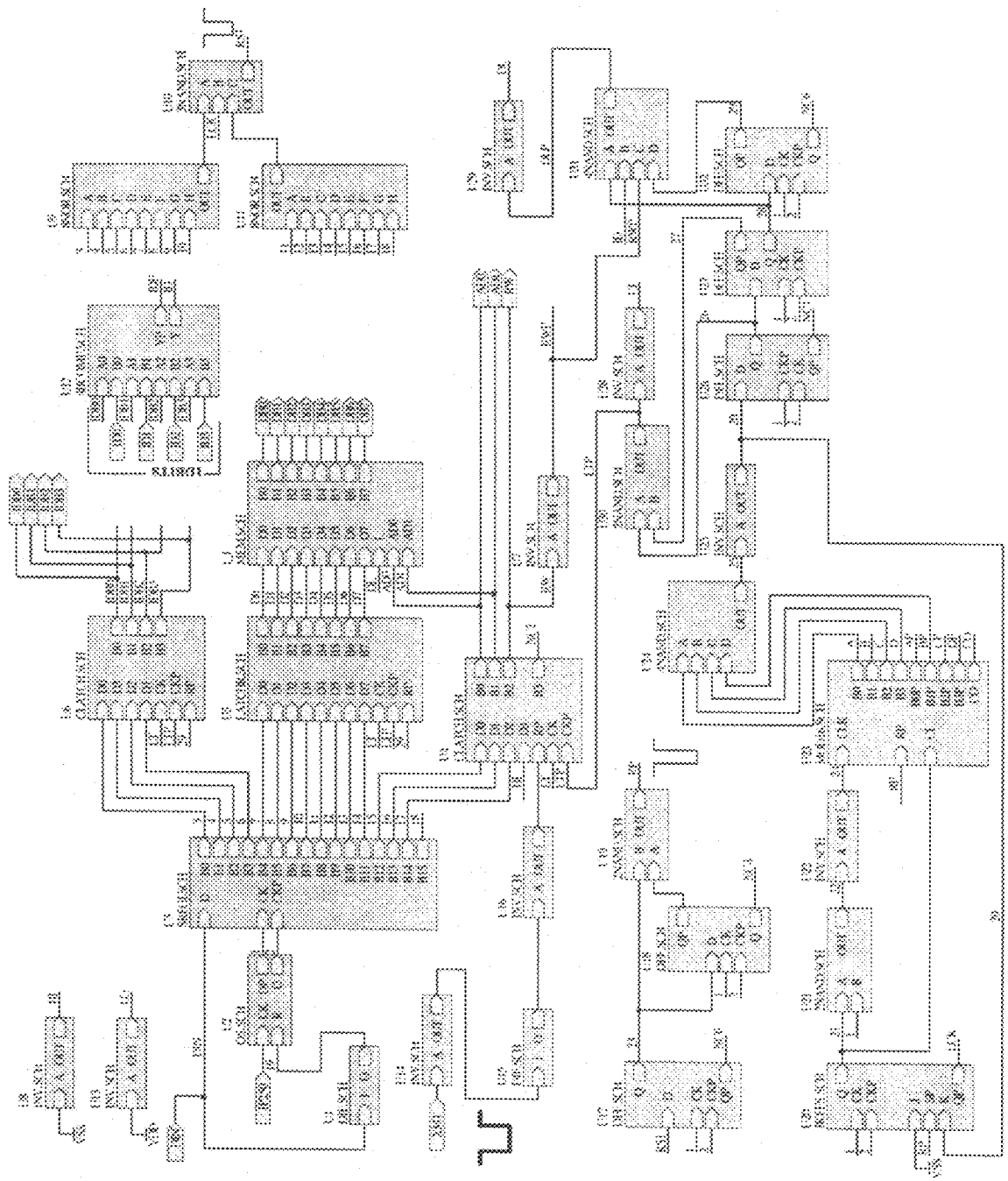
FIG. 3 shows the read control section of the chip.

The read control section is shown in FIG. 3. The data is serially transmitted to the chip by frequency-modulating the carrier wave (typically 10 GHz) with a frequency of 1 MHz for low signals (logic 0) and with 10 MHz for high signals (logic 1). On the chip, the incoming signal is demodulated and then sent through a high-pass filter. The output from this processing stage (not shown in FIG. 3) is applied to the DIN input. That signal is modulated to be either at a 25% or 75% duty cycle. The first 25% of the waveform is always high and the last 25% is always low. The input data determines if the 50% point on the waveform is a logic 0 or a logic 1 (if the signal is 25% duty cycle or 75%). The clock is recovered by determining the rising edge of the input signal with a digital differentiator (U1) and triggering a one-shot (U2) to the 50% time point. The signal level that is present at the input of the shift register U3 when the one-shot resets is loaded into the register. The output from one-shot U2 also provides the master clock for the flip flops and counters in the read control section. Its width is determined by an on-chip current source formed by the leakage current through a series of MOSFETs. Since this width is only used to distinguish between a 25% and a 75% duty cycle, the control current is not a critical parameter.

The SREGI block (U3) is the input shift register. It is a simple D type register with 16 cells. U4, U5, and U6 are simple D latches. They latch the data for the time required to see if a transmit command is being asked for or if the ID bits transmitted in the data stream agree with the chip ID, allowing the data to be written to memory. The latches are clocked 16 counts after a "1" is sensed in the data. In order to have a well-defined start of the data sequence, any data transmission to the chip must be preceded by an all "Os" state (16 bits). The first data bit then has to be a logic 1. This triggers the "OR" gates U9, U10 and U11 and generates the RST command which starts a digital one-shot. Once the one-shot is fired, the LCK command prevents the RST command from operating again until the cycle has timed out. The 16-bit counter MOD 16 (U23) controls the state of the read control section after a valid initiation pulse sequence is detected.

The RST command is normally low and therefore a logic 0 is normally clocked into D Flip Flop U17. This ripples into U18 and set RP normally high. When RST first goes high indicating the first presence of a logic 1 in the data, a logic 1 is clocked in U17. Then for one count, RP goes low, then goes back high. (RP only occurs on a low to high transition of the RST signal again explaining the requirement for an all "0's" condition to precede a real data set.) RP synchronously resets the MOD 16 counter and triggers the JKFF that controls the digital one-shot.

The digital one-shot consists of U20, U21, U22, U23, U24, and U25. It is triggered by the RP command. It could be retriggered in the middle of a count due to the RP reset of the counter, but the lockout on the RST command keeps this from happening. Once triggered, node 21 goes high allowing the AND gates U2, and U22 to send clocks to the counter. An additional (redundant) lockout is provided by node 21's control of the count input of the counter. A 4 input NAND gate is used to decode the count on which the one-shot times out. This is needed since the U17, U18 RP generator takes a few clock cycles to generate RP; those cycles must be subtracted from the 16 total counts required. D flip flop U26 (clocked on the falling edge of the master clock) is used to deglitch the output of the AND gate U24, 25 and to provide a clean input into the control signal generators U27 and U32. LT and DL are generated from the terminal count of the digital one-shot in the same way that the RP signal was generated from RST.

Write Cycle

When the LT command latches the digital word into the latches, the digital comparator U12 is used to compare the chip ID sent with the data stream to the hardwired chip ID bits on the die. If they match, the ID signal goes high enabling the DL signal. The Read/Write signal (RW) has to be low for the DL signal to go high. This requirement ensures that the memory is not overwritten by a transmit request (RW=1), only when sending data to the chip (RW=0). With all these conditions satisfied, data can be entered into the memory using the latched data and address applied to the memory block.

Note that the U5, U6 latches are reset by node 29. This keeps unwanted data from being inadvertently loaded into memory. Once the data is tested and conditionally used, it is erased.

Transmit Cycle

If RW is a logic 1, DL will not occur and no data will be latched into the memory. The address bits are, however, applied to the memory block, so whatever is in the selected memory controls the memory output bus. This provides the stimulus and data needed to start the transmitter sequence.

The XMT command is high during the transmit cycle. This signal is brought into the read control block to reset the address and latched RW signal on its falling edge, i.e., after the transmit cycle ends. This keeps the cycle from retriggering itself and hogging the RF I/O until the energy stored in the supply is gone.

Figure 4:
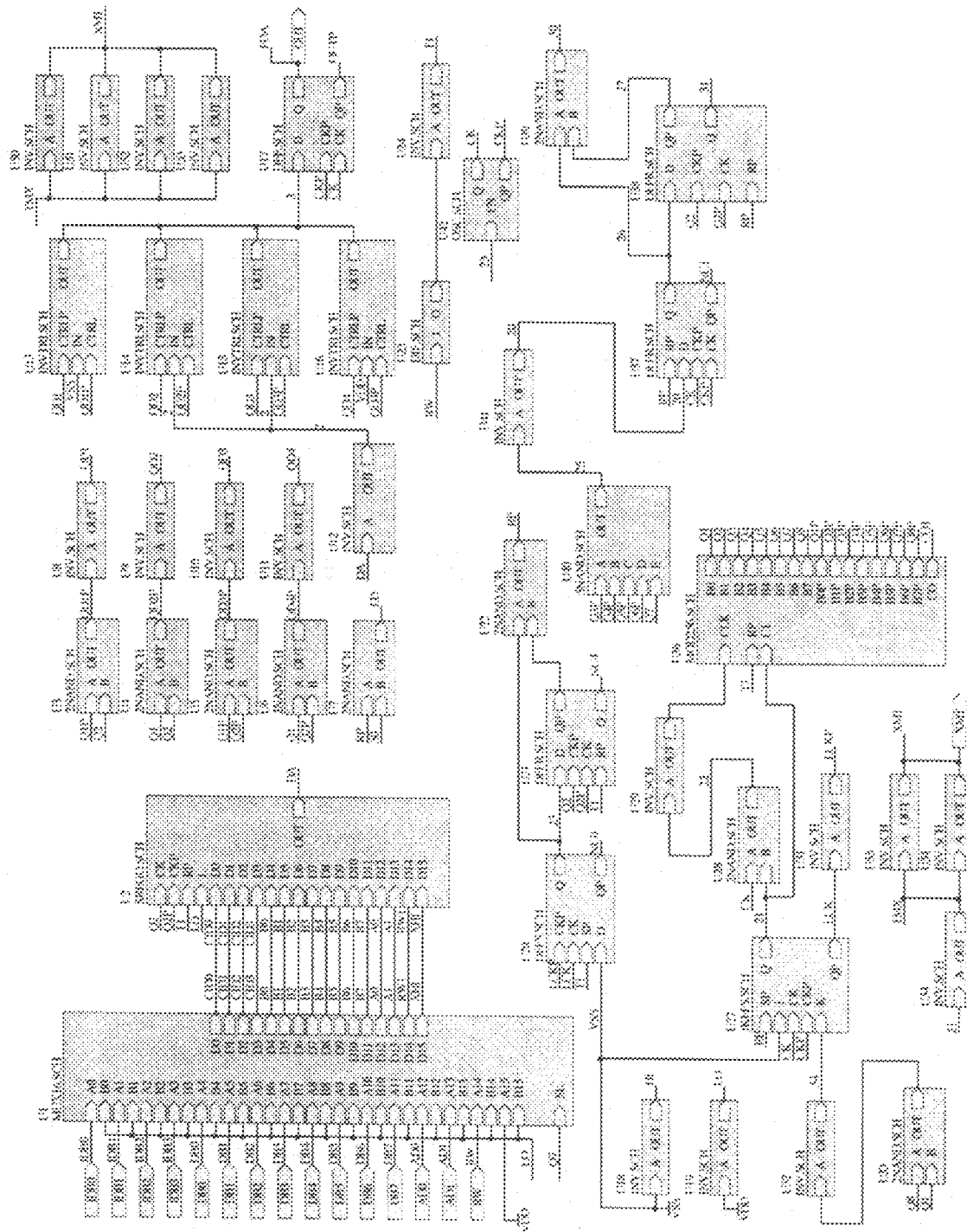
FIG. 4 shows the write control of the chip.

The write control section is shown in FIG. 4. Once enabled by appropriate commands, this section grabs data from the memory data bus, pulse-width modulates it in the same manner as the input signals were, and sends it out serially on the OUT line. As is the case with the data transmitted to the chip, an "all 0's" condition must precede the actual data, followed by a bit 1 to indicate the start of the data word. Therefore, MUX U1 first outputs zeros for the first 16 counts and then outputs data for the last 16 counts.

Another RP generator U20, U21 is part of this section. It is triggered by the rising edge of the RW command. The rising edge is determined by the digital differentiator U23, U24.

Since the pulse-width modulator divides the data output into four time periods, and 32 data bits are output during the transmit cycle, at least 128 counts are needed in the digital one-shot. Since there are various delay sources in the write control block, a 256-bit counter (MOD256) was used to align the timing. While some logic optimizations may be possible in this implementation, the applicant considers the design to be both all solid and functional.

Oscillator block U25 generates the on-chip clock. It is implemented as a simple gated ring oscillator. This was done (as opposed to charging and discharging a capacitor with a current source) to reduce power dissipation on the die.

At the appropriate time the AND gate U40, U41 sends a command pulse down the U37, U38 flip flops. generating the node 30 signal. Both this and the local RP command are normally high. When either of them goes low for one clock cycle, the NAND gate U7 sets LD high for that time, loading data from the multiplexer into the parallel-in serial-out shift register U2. RP loads the initial load of 16 zeros from the B inputs of the MUX into the SR, and the LD command caused by node 30 going low loads the data.

The data appears at the DA output of the shift register and is sent to the pulse-width modulator U12-U16. A set of AND decoders provides successive time periods QD1, QD2, QD3, QD4. The QD1 signal outputs a logic 1, the data appears at times QD2 and QD3, and a low is applied during time QD4. This again results in a 25% duty cycle for logic 0 and 75% for logic 1, while providing a rising edge for each bit, to facilitate the synchronization between transmitter and receiver.

Depending on the signal level at the DA output, one of the two receive oscillators shown in FIG. 2 is then enabled and selected. These oscillators are tuned to frequencies of 1 and 10 MHz respectively. At that frequency, they will drive a dipole antenna between a half-wave and quarter-wave reflector. The frequency will be picked up by the stationary receiver as an intensity modulation of the backscatter by the antenna. This eliminates the need for a power-consuming active transmitter on the chip.

Miscellaneous Functions

In this section, are described some of the more relevant individual circuits on the MicroTAG chip. Some of these circuits were deemed important enough to include stand-alone test versions on the edge of the die.

Figure 5:
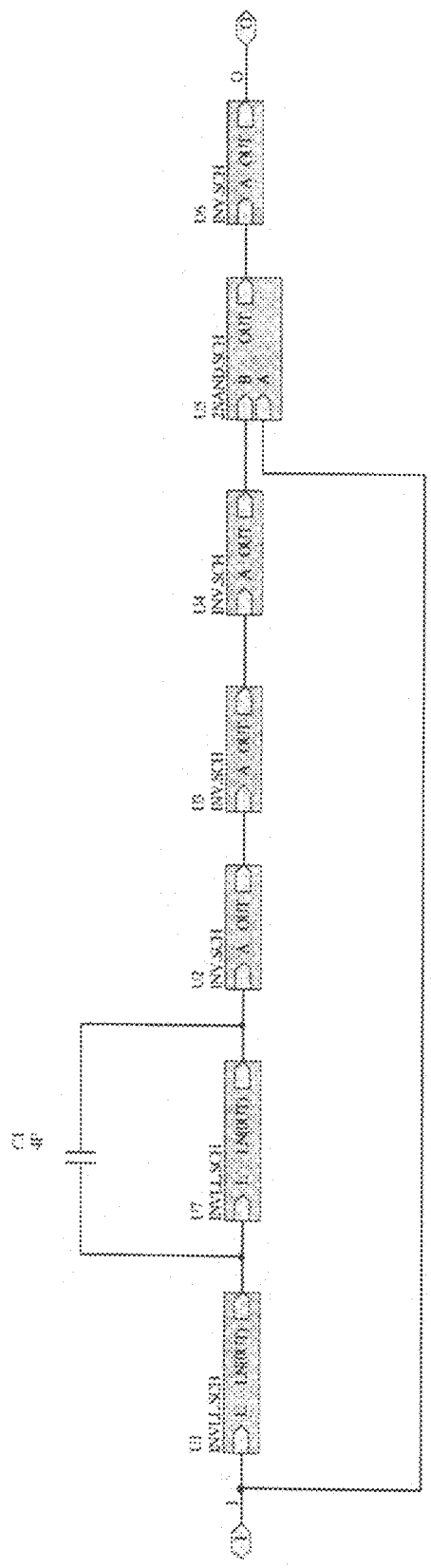
FIG. 5 shows the digital differentiator circuit of applicant's chip.

FIG. 5 shows a simple digital differentiator. Its purpose is to provide a short output pulse when it detects the rising edge of an input clock. The output pulse width is determined by the delay difference between the two signal paths to the two-input NAND gate. The "L" style inverters have been made with a longer (10 μm) gate length. When this higher resistivity inverter drives the bridging capacitance, the delay path is deliberately lengthened. The present design outputs about a 100 ns pulse when triggered. In addition to being part of both the read and write control units of the MicroTAG ASIC (Application Specific Integrated Circuit), a separate test version of the differentiator was placed on the chip.

Figure 6:
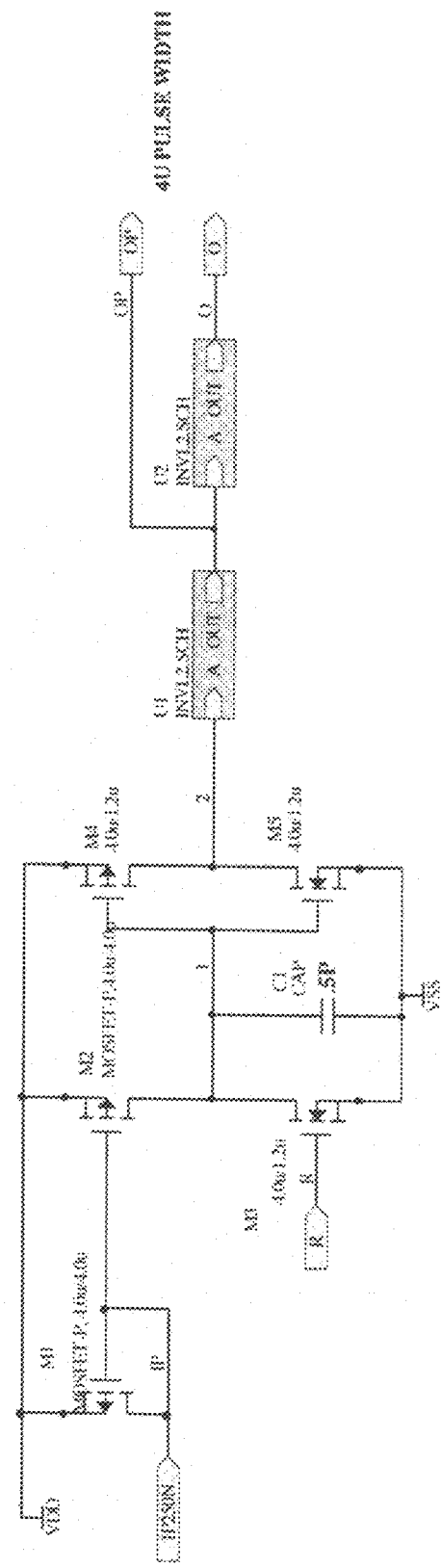
FIG. 6 shows a one-shot (monostable multivibrator) circuit.

The retriggerable one-shot is shown in FIG. 6. This circuit uses an input set current to program the one-shot's output pulse width. A logic high on the R input triggers the one-shot by turning M3 on, thus connecting the integration capacitor C1 to ground and setting node 2 high via the inverter M4, M5. As soon as R goes back to a logic low, the set current starts charging C1. As the voltage on the capacitor reaches the threshold of the inverter, the output pulse is stopped. The pulse width is set to about 50% of the incoming signal's period, so the one-shot, in conjunction with the differentiator, provides the required distinction between logic 1 and logic 0 in the input data, as discussed above. The corresponding set current is about 250 nA. Again, a separate test copy of the one-shot is implemented on the chip. For this circuit, the set current is supplied externally by connecting the appropriate pad (labelled 1P250N in FIG. 6) to ground through a suitable resistor. Since the input point is held 1 V below $V_{DD}$ by the transistor M1, the ratio of that voltage to the resistance determines the current.

Figure 7:
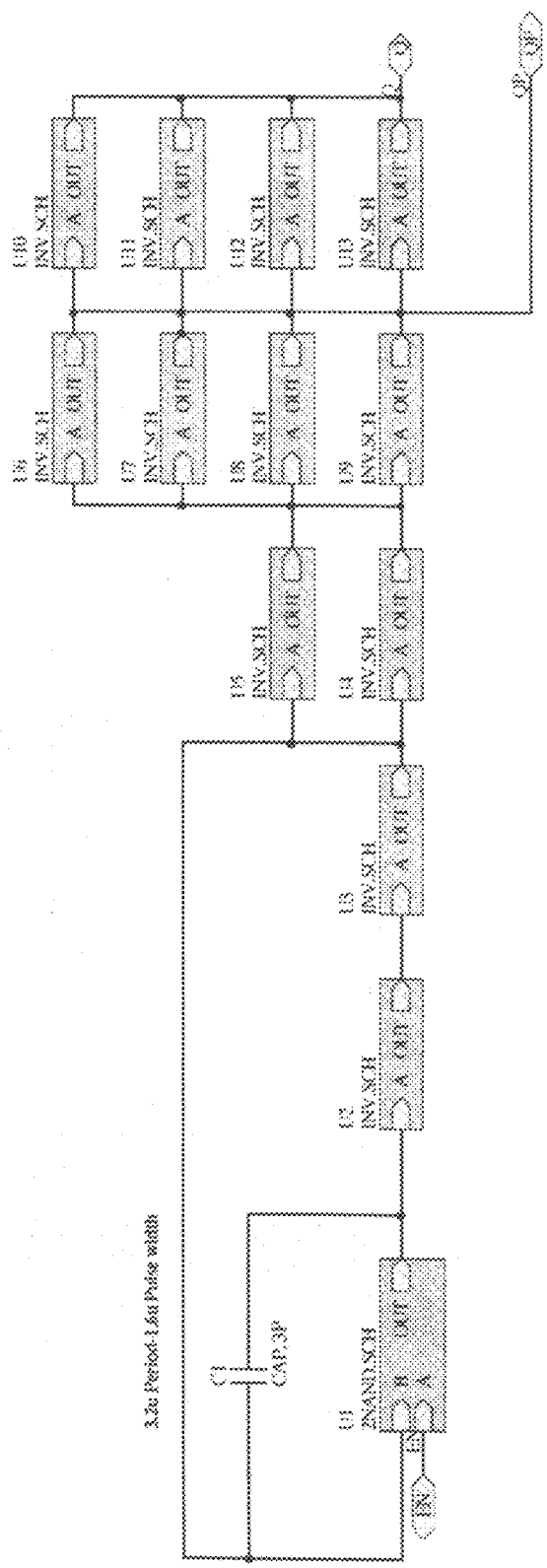
FIG. 7 shows an oscillator circuit.

The oscillator that provides the clock during data transmission from the chip is shown in FIG. 7 It is a gated ring oscillator whose period is extended beyond the propagation delay of its three gates by bridging the two-input NAND gate with a 3 pF capacitor. The resulting frequency is still more than twice as high as the 100 kHz of the input signal. This means that the transmission can be completed before the read control circuit is reset by the next sequence of 16 zeros. Consequently, the timing of the data transmission to the chip can be simplified by not having to wait for the transmission from the chip to complete. (This, of course, requires that the stationary transceiver is set up in such a way that any possibility of interference between the two signals is eliminated.) There can be a separate test version of this circuit too.

Figure 8:
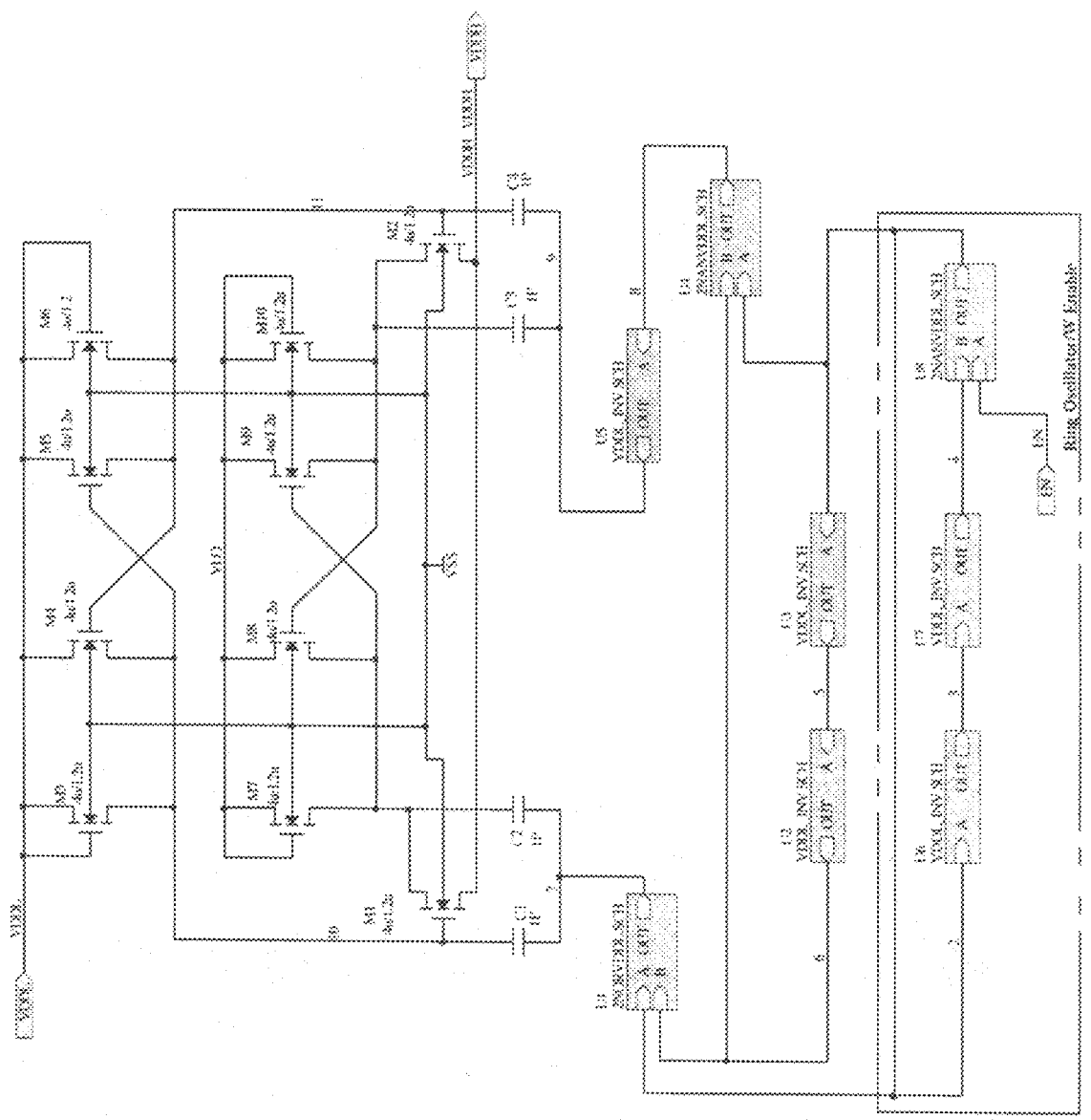
FIG. 8 shows a charge pump circuit.

For a final version of the MicroTAG chip ROM circuits may be used to store the relevant data permanently, independent of a continuous power supply. To program these ROMs, a higher voltage than the one supplied to the rest of the chip will be needed. To generate this higher voltage, one may use a charge pump similar to the one shown in FIG. 8. Though the present version of the chip does not contain any ROM circuitry, one may place a test version of this charge pump on the chip in order to investigate the ROM embodiment concept.

Figure 9:
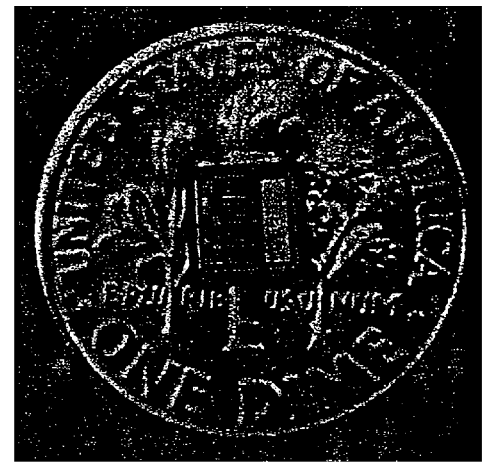
FIG. 9 shows a relative size of the chip to that of a dime.
Figure 10:
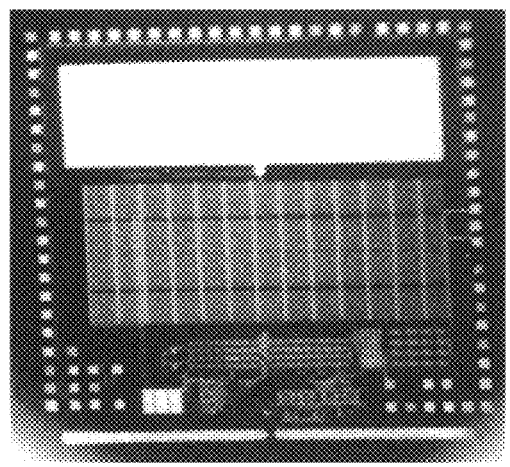
FIG. 10 shows a view of the finished chip and chip layout.
Figure 11:
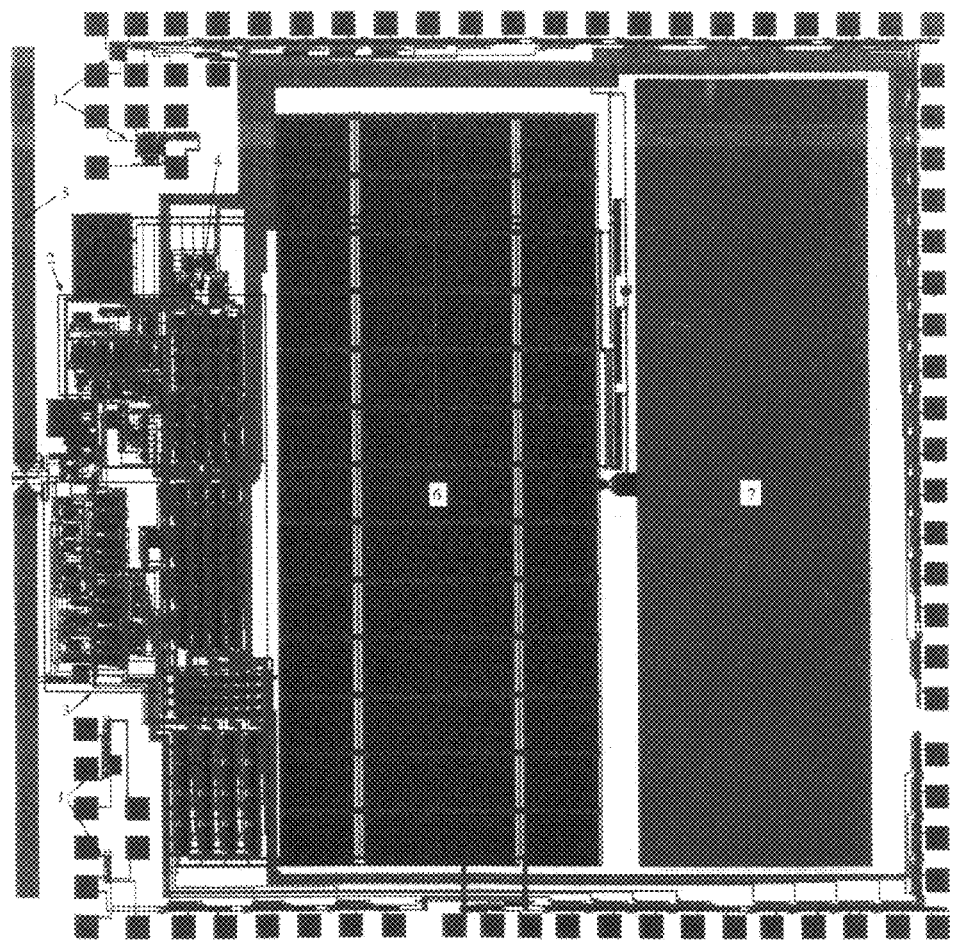
FIG. 11 shows a view of the finished chip and chip layout.

Two photographs of one of the finished chips and the chip layout are shown in FIG. 9 to FIG. 11 respectively. The layout shows the various individual test circuits (1), the read (2) and write control sections (3), the shift registers and memory (4), the backscatter antenna (5), the capacitor array for power storage (6), and the receiving antenna (7).

Experimental Results

Those of ordinary skill in the art can make changes and corrections to the disclosure herein to achieve an actual reduction of practice of this invention following the suggestions and procedures disclosed below.

The chips can be packaged in a pin grid array with a suitable footprint and a suitable socket. One can use pin strips in the right arrangement to socket the chips. This, however, has the drawback that the contacts are not reliable. For example, the pad that gates the chip power supply may not contact well to the corresponding switch on the test board; fortunately, that means that the gate is permanently open.

As a consequence of these problems, the following results were obtained.

Figure 12:
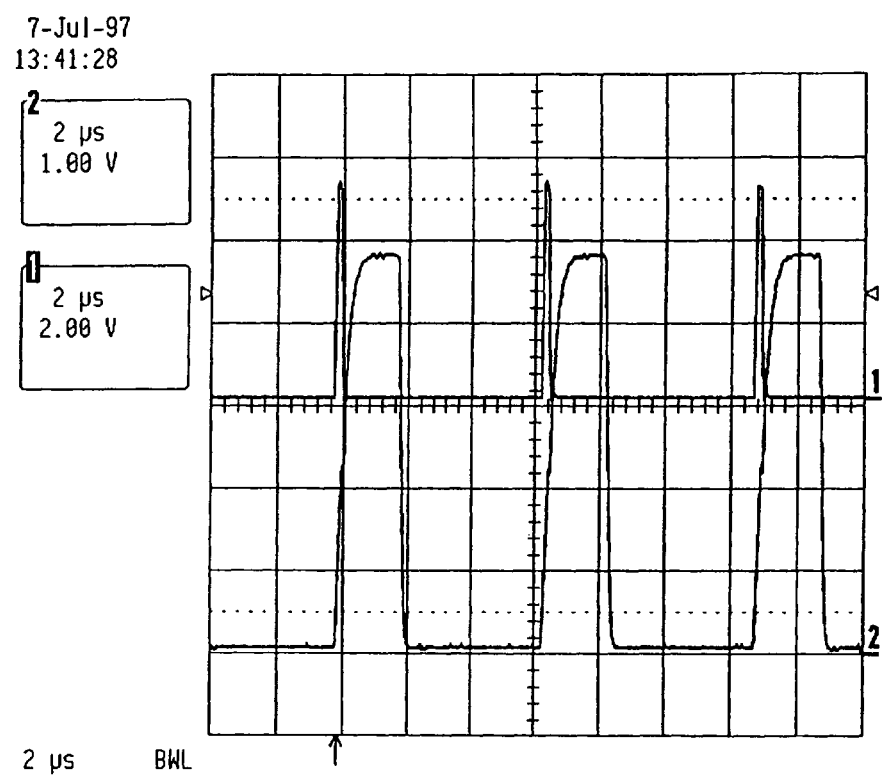
FIG. 12 shows the test results for the one-shot circuit. The input is trace 1 and the response is trace 2.

The one-shot circuit (FIG. 6) was tested by sending short pulses from a pulse generator to its input. These pulses were about 200 ns wide, with a repetition rate of about 150 kHz and an amplitude of 5 V. They are shown in trace 1 of the oscilloscope screen dump displayed in FIG. 12. The circuit's response to these trigger signals is shown in trace 2 of the same figure. Four of the five chips tested showed a similar response, both in pulse width 1.7µ beyond the end of the trigger pulse) and amplitude (between 4.5 and 5 V). The fifth chip just output a 5 V DC level, possibly indicating that the charging of the capacitor did not work in this case. In order to compare the observed pulse width to the design value of 4µ, the measured value has to be scaled by the ratio of the current used to charge the capacitor (about 400 nA) to the design current of 250 nA. Taking this into consideration, the measured pulse width corresponds to about 70% of the design value.

The oscillator test circuit was tested by connecting its power supplies to 5 V and ground respectively and setting its enable input (EN in FIG. 7) alternatively low or high. With EN low, three of the chips performed as expected, giving a low signal level (logic 0) at the output and a high level (logic 1) at QP. The other two circuits gave the same level at both outputs, 5 V in one case and 0 V in the other.

Next, applicant connected the power supply for the main MicroTAG circuit. This voltage was directly supplied to the chip carrier, again using a microprobe. When this was done, one could actually see the voltage on the capacitor array go down, as expected, in two cases. The other three chips were not affected by the control voltage.

At this point in the test sequence, one chip was taken for closer, microscopic inspection, as discussed above. 2µ second wide pulses were supplied (50 kHz repetition rate) to the serial data input of the chip (DIN in FIG. 3) the recovered clock signal from the differentiator/one-shot combination U1, U2 was observed by probing nodes 1 and 2 of the read control circuit (cf. FIG. 3). Two of the chips showed no "reaction" to the data, i.e., the level at node 1 was constantly low, while the level at node 2 was high. In the third case, node 1 was constantly low too, but node 2 was an exact copy of the data input. Even when the width of the input pulses were varied, the width of the output varied correspondingly. This indicated that rather than the output from the one-shot, a short circuit between DIN and node 2 was observed. The fourth chip gave a signal on node 1 that was normally at 2 V and went down to 0 for 1µ in response to an input signal on DIN. The signal on node 0, on the other hand, was normally at 0 and went up to 3.5 V for 1µ in response to an input. While the pulse duration was shorter than expected, indicating that the on-chip current is larger than its design value, and the signal levels were less than the usual CMOS values, which may be an artifact of the bidirectional switches, the result shows that the clock recovery on this particular chip worked at least in principle.

Figure 13:
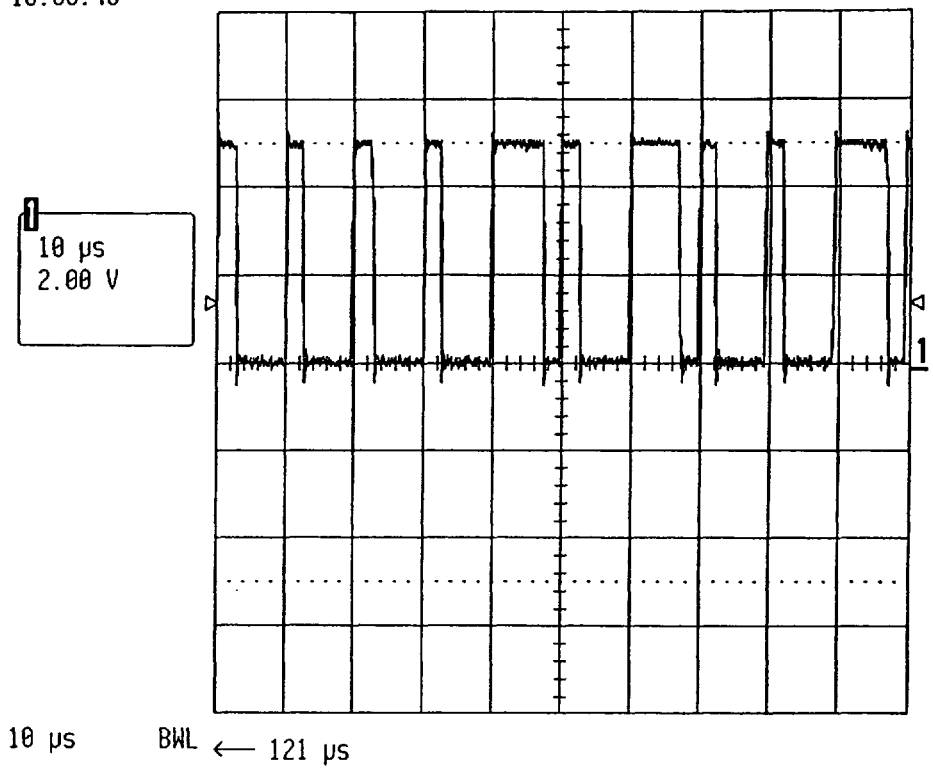
FIG. 13 shows a segment of the computer-generated data signal used to test the MicroTAG chip's read control circuit.

The pulse width of this recovered clock signal was not enough for processing our computer-generated serial data signal. The minimum pulse width applicant was able to generate with our computer setup was 2µ As discussed above, the logic on the MicroTAG chips assumes that the data is encoded by representing a logic 0 by a 25% duty cycle and a logic 1 by a 75% duty cycle; an example of this is shown in FIG. 13. Consequently, the minimum period our signal could have was 8µ This means that the recovered clock, with its 1µ pulse width, was not able to distinguish between the two logic states of the input signal.

A segment of the computer-generated data signal used to test the MicroTAG chip's read control circuit is shown in FIG. 13. The period of the signal is 10µ. The narrow pulses (≈25% duty cycle) represent logic 0, the wide pulses (≈75% duty cycle) represent logic 1.

Figure 14:
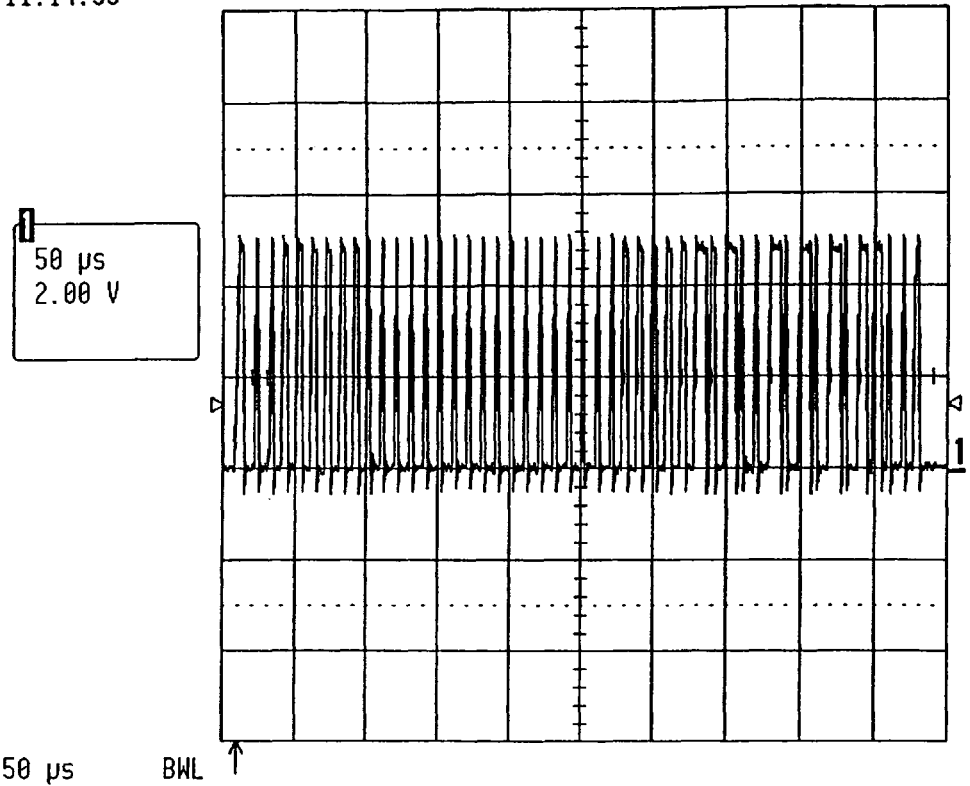
FIG. 14 shows a serial data signal sent to the chip.

Instead, applicant had to provide the clock signal externally, synchronized with the data signal. In fact, the two signals were generated to be identical, except for the duty cycle, which was a constant 50% for the clock. The data signal consisted of a sequence of 32 "leading" zeros to reset the read control circuit, followed by the actual 16-bit data word; this is shown in FIG. 14. The number of leading zeros was doubled from the required value to avoid any possible problem with the reset, caused by the first pulse of any pulse train being wider than the remaining pulses. Though this was not relevant when the clock signal was supplied externally that signal's first pulse was correspondingly wider itself it might have caused the recovered clock to misidentify the first bit as a logic 1 and load it and the next 15 bits into the register, rather than resetting the chip. FIG. 14 shows the serial data signal sent to the chip. The pulse train consists of 32 "leading 0s" followed by the actual 16-bit data word.)

Sending both the data and the clock to the prototype MicroTAG chip did not lead to the expected results, however. Though the eight data bits to be written to the latch register 5 (FIG. 3) alternated between 1 and 0, all outputs of that latch register remained at 0. Suspecting a mismatched chip ID as the reason for this, applicant measured the on-chip ID to verify if it agreed with the ID bits applicant was sending. Since it did, excluding this simple explanation for our problem, applicant decided to postpone further tests until applicant could obtain better sockets for the chips and concentrate on preparing this proposal which was overdue.

Remote Power Deposition onto the MicroTAG Chip

Figure 1:
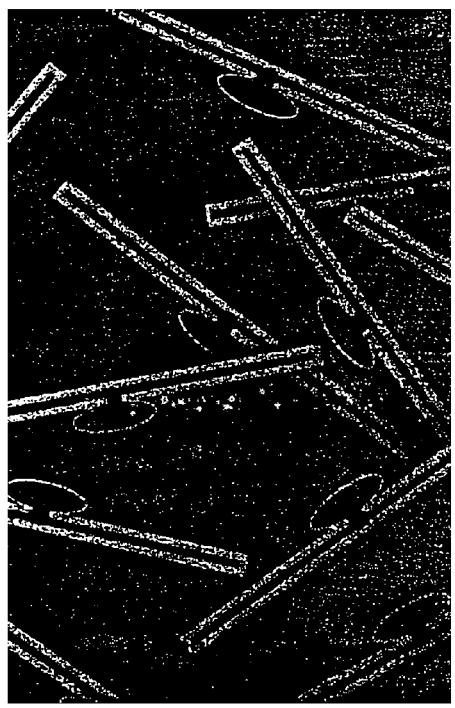
FIG. 1 shows a description of the state of the art in RED (TAG) chips as developed by SCS Corporation as reported in EDN magazine Jun. 19, 1997.

The most important function to test is the deposition of power onto the MicroTAG chip. None of the present tag chips (FIG. 1) have such a small onboard antenna about 1×3 mm (FIG. 11) for power deposition to activate the tag circuitry. This is also the most crucial function to demonstrate in showing that the chip will work. The rest of the circuitry is more conventional in design and relatively straight forward. Above test results show that the other functions are mostly working for the first prototype.

A microwave generator tuned to the MicroTAG chip input antenna was not available. The power input antenna design was optimized for 16 GHz with an effective dielectric constant of 4.0 for the silicon dioxide. The antenna was expected to have sufficient sensitivity for 10 to 15 GHz microwaves to power the MicroTAG chip. To carry out this demonstration an old 600 W microwave oven was selected to demonstrate that the power input antenna will receive power and charge up the onboard capacitor bank. Microwave oven uses 2.45 GHz microwave generator which has an effective loss of a minimum of 20 db. This is a power relationship so this is more than 100 times less power than at resonance. Therefore, the antenna sensitivity was significantly low for this demonstration. Therefore, the potential on the capacitor bank was expected to increase by about 20 to 40 mV instead of few Volts.

The microwave oven is extremely powerful for the MicroTAG chip although it was one of the least powerful units available in the market. The power was applied by an indirect way. Microwave power was directed to the MicroTAG chip by cutting a hole in the oven's door and placing a reverse horn arrangement of about 20 inch length with about 5 cm entry and about 2 cm exit diameter. This allowed only a small fraction of the scattered microwaves to reach the MicroTAG chip greatly reducing the power. The power output of the microwave oven was also fixed and not adjustable. The power settings of the oven only changed the duty cycle not the power output.

The power reading is also attenuated by the source follower circuit because of the gate turn on voltage required by the NMOS sensing transistor. Best sensitivity is obtained with R2 (pull down resistor to ground for the capacitor bank monitor pin) in the 1 k to 500 ohm range. During the testing only 1 k Ohm pull down resistor used.

Power in a microwave oven interior is more efficiently coupled at some points than others. This is because standing wave patterns are setup in side the oven's cavity. The coupling point for power may have been non-optimum during this demonstration. The horn antenna used to deliver power is also improperly matched thus creating a large SWR (standing wave ratio) which means a large insertion loss.

To carry out the tests the MicroTAG chips #5 and #6 were placed on the probe station in turn. Three microprobes were used to contact to the three chip pads, Vdd power, ground and the capacitor voltage Monitor. The 1 kOhm pull down resistor was connected between the voltage monitor pin and the ground. The reverse horn arrangement from the microwave oven was brought near the chip within about 1 cm to the chip antenna in horizontal direction as the probe station microscope was in the way for a more optimum vertical approach. Five volt Vdd power was applied using a low voltage power supply. Initially it was found that the microwave oven was effecting the output of the low voltage power supply by about +0.2 V when they were placed close to each other. Although, this effect was not important for turning on the monitor transistor, the low voltage power supply moved away from the microwave oven and this effect was eliminated completely.

The tests showed that when the microwave oven was turned on for about 10 seconds the output at the capacitor voltage monitor pin went up from about 0.697 V to 0.703 V, a raise of about 6 mV. The raise happened within about one second and the voltage stayed at this level fluctuating by about ±1 mV until the power shut down. If the reduction in sensitivity due to non-optimum antenna matching is 100 then this corresponds to about 0.6 V deposited onto the onboard capacitor bank without considering the other loses as discussed above. Applicant carefully checked that this effect was not caused by pickup from the microwave oven. Therefore, several tests were carried out such as turning off the power to the chip which resulted in no increase in the output voltage from the 0 mV level it had reached. The pickup probe was also disconnected to see if there was any pickup through the connections. Again there was no increase seen in the meter display. If one considers the other loses listed above it may be possible to explain about a factor of 5 lower reading then expected. Antenna response using a more optimum microwave generator running at or near 10 GHz should be checked. The geometry and other conditions should be optimized.

The simulated graphs of the voltage applied versus the voltage out indicate that the MicroTAG chip circuit only responds well once the received signal power is sufficient to deliver an equivalent voltage of 1.3 volts or better. This is especially important if the operating position was near the knee of the response curve. To correct for this possible limitation applicant tried to increase the gate drive to the CMOS pass transistor by floating the ground connection to the MicroTAG chip. However, using this arrangement increased the capacitor voltage monitor output from 2.402 V (microwave oven off) to 2.420 V (microwave oven on), an increase of about 18 mV. The antenna sensitivity difference means that the increase in the voltage, if a more optimum microwave generator was used, would have been 1.8 V.

The results of these tests have demonstrated that it was possible to remotely deposit power onto the MicroTAG chip. The calculations and observations have showed that the voltage reached by the onboard capacitor bank was close to what may have been reached if a microwave generator matched to the MicroTAG chip power input antenna was used.

MicroTAG Chip Application System

The glue that is to be used in applying the chip has to fulfill several conditions with respect to application temperature, bond strength, and health hazards:

The application temperature should be high enough that there is no risk of the glue softening and losing its strength at any of the environmental conditions to be expected once the chip is applied. On the other hand, if the temperature is too high, damage to the chip or the surface of the object being tagged might result, or the glue might solidify before reaching its target.

The bond provided by the glue has to be strong enough to ensure a reasonable protection against accidental separation of the MicroTAG chip from the package being tagged, e.g., by bumping into other pieces of baggage. Again there is a contradictory requirement, namely that the chip should be removable once it has served its purpose. Considering the wide range of surfaces to be tagged, it appears doubtful that these two requirements can be reconciled completely, short of using one of the following options:

Manually applying the chip, making sure it is in a location where it is protected from accidental contact. Of course, this would defeat the purpose of automating the process as much as possible. One option would be to embed the chip in the paper tag used for routing the baggage unless the chip is intended to replace the paper tag in the long run.

Using a strong glue that is not intended to be removed, so the MicroTAG chip would be reusable rather than being discarded each time. This would alter the requirements concerning the long-term reliability of the chip and necessitate an additional component in the application system to identify bags that are already tagged. Finally, this method would likely face problems with public acceptance.

Since none of these alternatives looks realistic, a reasonable compromise will have to be found.

With the potential for liability in mind, this compromise will likely have to "err" on the safe side.

Note that, of course, these considerations are subject to change when less public projects are concerned, e.g., tagging freight.

Since the glue will be exposed to large segments of the public, including small children, but also for the protection of personnel working around the MicroTAG applicator, health hazards associated with the glue (and, incidentally, with the chip itself) have to be considered carefully. These hazards include choking, toxicity under various circumstances, such as ingestion, inhalation, or skin contact, burn injuries, and flammability of the material. For these reasons, the glue selected has been used readily and in much larger quantities in general mailing, packaging and other commercial materials for the general public for many years. It is, therefore, safe to use for this application since it has already been in circulation to the general public.

These considerations led to the selection of two types of glue, HM-2703 and HL-2198-X (which is presently qualified as an "experimental product" by the manufacturer), both hot-melt adhesives manufactured by H.B. Fuller Company in St. Paul, Minn. The two types are similar to each other in many aspects; the main difference is in their viscosity profile as a function of temperature. The viscosity data from the technical data sheets are summarized in Table I.

TABLE I

Temperature dependence of the viscosity of the two glue types selected (from the technical data sheets provided by H.B. Fuller Co.).

| Temperature | | HM-2703 Visc. | HL-2198-X Visc. |
| --- | --- | --- | --- |
| (° F.) | (° C.) | (mPa · s) | (mPa · s) |
| 250 | 121 | 137,500 | 30,000 |
| 275 | 135 | 35,000 | Not Available |
| 300 | 149 | 12,000 | 4,400 |
| 325 | 153 | 5,625 | Not Available |
| 350 | 177 | 2,750 | 1,460 |

The recommended application temperature is 325° F. (163° C.) for both types. While this may seem like a rather high temperature for some of the plastic materials to be tagged, one has to bear in mind that the heat content of the small drop of adhesive involved (0.2 g or less) is not enough to cause any problems. Applicant verified this by doing a "worst-case test", applying the adhesive to a standard supermarket plastic bag (polyethylene) at a temperature of 190° C. (375° F.). There was no significant heat-related damage to the bag, at worst a slight wrinkling that might just as well have come from the act of removing the glue in order to inspect the bag. As expected after this, other, less sensitive materials were not affected at all. The materials tested include various kinds of plastics (including those used in hard-shell suitcases), metals, wood, cardboard, paper, leather, glass, and various types of cloth.

With the minor possible exception noted above for plastic bags, removal of the cold glue did not cause any noticeable damage to any of these materials. It should be noted, though, that the clean removal from some of the more textured materials, such as velvet or Velcro, while still not causing any damage, was comparatively difficult to accomplish.

The adhesive strength provided by the glues is not listed in the technical data sheets. Of course, one would expect this parameter to depend on the surface characteristics of the material(s) involved, particularly its roughness. To get an approximate idea about the range of values involved, applicant performed a series of measurements in the following manner: A block of the material to be tested was clamped down in a vise and a sample of the glue was heated on its surface. Then a plastic (acrylic) disk was pressed into the liquid glue. An eye on the back side of this plastic disk allowed applicant to insert the hook of a spring balance which applicant used to measure the force required to break the bond formed by the glue, after it had cooled down and set. This force was then divided by the area of the glue "patty" in order to obtain the strength of the bond. Naturally, this method is limited to materials that can handle the heating process and are either sturdy enough to be clamped down in a vise or heavy enough by themselves to not need any clamping. Moreover, it obviously does not work for any materials that form a stronger bond with the glue than the acrylic itself. Typical values measured were 50-60 kN/m$^2$ for aluminum, 80-90 kN/m$^2$ for the surface of a typical hard-shell case, and ≈150 kN/m$^2$ for both wood and acrylic.

One other concern is that at low temperatures the glue might become brittle, possibly reducing its adhesive strength and ability to withstand external forces. Tests done by freezing a test surface after applying the glue showed no noticeable effects of this kind.

The material safety data sheets (MSDS) for both products indicate that there are no known health hazards associated with the cold, solid glue. The potential risks considered in the MSDS include skin contact (no known effects), ingestion (not anticipated to be harmful for amounts up to 5 g/kg of body weight, which should be compared to 0.2 g or less required per chip), chronic effects (none anticipated), effects on other illnesses (none known), and carcinogen status (neither product contains regulated levels of carcinogens listed by various regulatory agencies). There are risks associated with the hot glue, specifically burn risks and irritation of eyes and/or respiratory tract as well as dizziness caused by the vapors. Consequently, the applicators should be located in well-ventilated areas removed from general traffic.

The flash point of the glue is listed as "greater than 400 degrees F." for either material, which is well above the recommended application temperature. This, of course, does not eliminate the need for fire protection devices in case of equipment malfunction.

One risk that is not taken into account in the MSDS, most likely because it is a generic rather than material-specific hazard, is choking. Since the size of our glue pellets falls into the dangerous range—small enough to be swallowed, but large enough to get lodged in a windpipe—this constitutes a risk that definitely has to be considered. The danger is increased due to the fact that the glue is similar in consistency to gelatin products like gummy bears. It might be reduced, but not entirely eliminated, by adding a suitable substance to embitter the glue. It should be noted that this choking hazard is inherent to the concept of having a small, removable chip on the baggage and is not limited to any particular method of applying the chip nor to any particular kind of glue. The glue used, in fact, is too small to block a windpipe. However, no safe minimum size is defined by authorities. On the other hand, many toys children play with every day such as the eyes or buttons on a doll are, in fact, larger in size than the glue used for MicroTAG application and can be significantly more hazardous.

Figure 15:
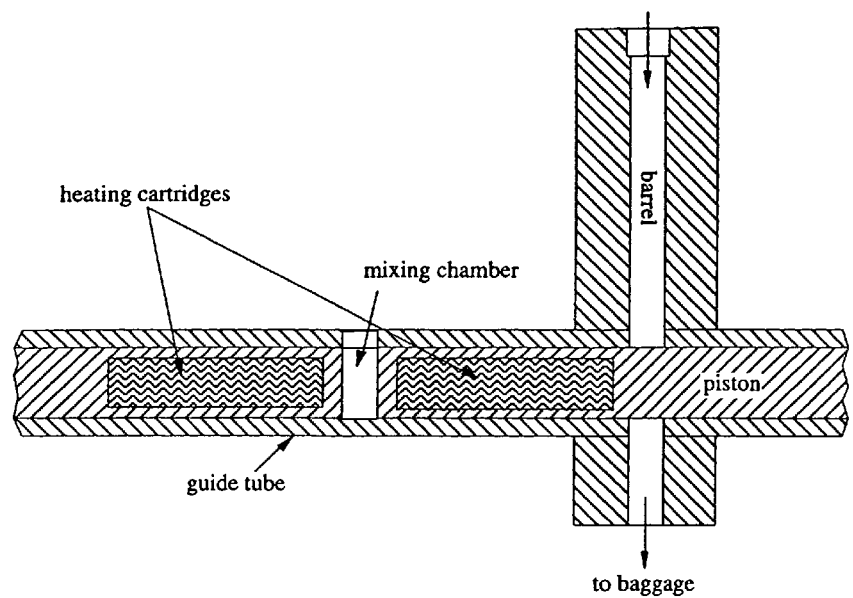
FIG. 15 shows the principle components of the MicroTAG applicator.

Applicant developed, fabricated, and tested a manual MicroTAG applicator. Its principal components are shown in FIG. 15. The system is shown in the position used to insert the glue and chip. The mixing chamber is filled with a chip (simulated in the tests by a 4×4×1 mm$^3$ of copper) sandwiched between two pieces of glue (each typically 0.1 cm$^3$ in volume) through the opening in the guide tube. The glue was then heated to the application temperature by the two heating cartridges embedded in the piston on either side of the mixing chamber. As soon as the desired temperature is reached, the piston is moved to the right to align the mixing chamber with the barrel. In practice, since applicant had no good way to continuously monitor the glue temperature itself but applicant was able to measure the temperature of the heaters, applicant kept that temperature constant and heated each pellet for a fixed amount of time. Finally, the glue and chip were shot out by a pump-action air gun. The barrel was externally heated by a heat gun, in order to keep the projectiles from cooling down too quickly and getting stuck on their way down the barrel.

One problem with this design is that the short, explosive burst of air put out by an air gun made it relatively difficult to apply just enough force to the chip to get it out but keep it from bouncing off the surface it hits. In our case, this problem was made even more difficult because the control of the air pressure (via the number of times the pump on the gun was used between shots) was rather coarse and led to some variation in the results. While applicant added a row of small air holes to the upper part of the barrel in an attempt to fine-tune the pressure by covering an appropriate number of them, however due to large pressure variation it was not useful. The air holes did, however serve the additional purpose of providing a safety "valve" in cases where the gun was shot while the barrel was blocked by the piston.

The temperature of the system was monitored by a pair of type J thermocouples that were integrated into the heaters. The calibration of this thermocouple type for the temperature region of interest to applicant is shown in Table II. There, the temperature of the measurement junction is listed as a function of the thermoelectric voltage between that junction and a reference junction that is kept at 0° C. If the reference junction is at a different temperature, e.g., room temperature, the thermoelectric voltage that corresponds to that temperature has to be added to the measured voltage before determining the measured temperature.

The applicator was tested under various conditions with regard to the amount and the temperature of the glue applied as well as the force with which the glue was shot out (or more precisely, the number of times the pump of the air gun was actuated between shots). The rubbery consistency of the glue and the irregular "pillow" shape in which it was delivered made it difficult to cut it into pieces of a reproducible size. Therefore, applicant melted the glue and "cast" it in the shape of cylindrical "rods" 4.75 mm in diameter, after running a series of tests to verify that repeated heating and reheating of the glue did not noticeably degrade its performance. These rods were then cut to the desired length, between 3 and 7 mm, which corresponds to volumes between 0.05 and 0.12 cm$^3$. The advantage of this method was that the uncertainty in the amount of glue was due to just one cut over a relatively small area; that cut was much easier to control than the ones needed to "carve" the required amount out of the original pillow.

TABLE II

Calibration of type J thermocouples (R.L. Powell et al., 1974). The temperature T of the measurement junction is listed as a function of the thermoelectric voltage U between that junction and a reference junction that is kept at 0° C.

| U (mV) | T(° C.) | U (mV) | T(° C.) | U (mV) | T(° C.) | U (mV) | T(° C.) |
|---|---|---|---|---|---|---|---|
| 0.0 | 0.0 | 2.5 | 48.4 | 5.0 | 95.1 | 7.5 | 140.8 |
| 0.1 | 2.0 | 2.6 | 50.3 | 5.1 | 96.9 | 7.6 | 142.6 |
| 0.2 | 4.0 | 2.7 | 52.2 | 5.2 | 98.8 | 7.7 | 144.4 |
| 0.3 | 5.9 | 2.8 | 54.1 | 5.3 | 100.6 | 7.8 | 146.2 |
| 0.4 | 7.9 | 2.9 | 56.0 | 5.4 | 102.4 | 7.9 | 148.0 |
| 0.5 | 9.9 | 3.0 | 57.8 | 5.5 | 104.3 | 8.0 | 149.9 |
| 0.6 | 11.8 | 3.1 | 59.7 | 5.6 | 106.1 | 8.1 | 151.7 |
| 0.7 | 13.8 | 3.2 | 61.6 | 5.7 | 108.0 | 8.2 | 153.5 |
| 0.8 | 15.7 | 3.3 | 63.5 | 5.8 | 109.8 | 8.3 | 155.3 |
| 0.9 | 17.7 | 3.4 | 65.4 | 5.9 | 111.6 | 8.4 | 157.1 |
| 1.0 | 19.6 | 3.5 | 67.2 | 6.0 | 113.4 | 8.5 | 158.9 |
| 1.1 | 21.6 | 3.6 | 69.1 | 6.1 | 115.3 | 8.6 | 160.7 |
| 1.2 | 23.5 | 3.7 | 71.0 | 6.2 | 117.1 | 8.7 | 162.5 |
| 1.3 | 25.4 | 3.8 | 72.8 | 6.3 | 118.9 | 8.8 | 164.3 |
| 1.4 | 27.4 | 3.9 | 74.7 | 6.4 | 120.8 | 8.9 | 166.1 |
| 1.5 | 29.3 | 4.0 | 76.6 | 6.5 | 122.6 | 9.0 | 168.0 |
| 1.6 | 31.2 | 4.1 | 78.4 | 6.6 | 124.4 | 9.1 | 169.8 |
| 1.7 | 33.1 | 4.2 | 80.3 | 6.7 | 126.2 | 9.2 | 171.6 |
| 1.8 | 35.1 | 4.3 | 82.1 | 6.8 | 128.1 | 9.3 | 173.4 |
| 1.9 | 37.0 | 4.4 | 84.0 | 6.9 | 129.9 | 9.4 | 175.2 |
| 2.0 | 38.9 | 4.5 | 85.8 | 7.0 | 131.7 | 9.5 | 177.0 |
| 2.1 | 40.8 | 4.6 | 87.7 | 7.1 | 133.5 | 9.6 | 178.8 |
| 2.2 | 42.7 | 4.7 | 89.5 | 7.2 | 135.3 | 9.7 | 180.6 |
| 2.3 | 44.6 | 4.8 | 91.4 | 7.3 | 137.2 | 9.8 | 182.4 |
| 2.4 | 46.5 | 4.9 | 93.2 | 7.4 | 139.0 | 9.9 | 184.2 |

The dependence of the efficiency of the manual MicroTAG application system on the amount of glue used is shown in Table III and Table IV. The difference between the two tables is the amount of force used to shoot out the glue and chips. The data in Table III were obtained by pumping the air gun once between successive shots; in Table IV applicant pumped twice between shots. In both cases, the system was kept at a temperature of 160° C. This was slightly above the recommended application temperature, to compensate for the fact that the measurement was made directly at the heater rather than in the mixing chamber. The heaters were regulated to keep the readout of the thermoelectric voltage within ±0.1 mV of the nominal value; this corresponds to a temperature variation of ±2° C. For each shot, the applicator was filled with a copper test chip sandwiched between two pieces of glue each of which had half the size specified in the table. Once the filling was completed, the glue and chip were left in the applicator for 15 s, in order to melt the glue, and then shot out onto a hard-shell briefcase used as a test target. This was done 20 times for each condition.

Table III clearly indicates that pumping the air gun once is not sufficient to reliably get the glue and chip shot out of the applicator. In more than half the attempts, the glue and chip did not come out of the air gun barrel, regardless of the amount of glue used. In fact, when applicant used 0.24 cm$^3$ of glue, the result was so consistent that applicant decided to give up after ten attempts. When pumping twice (Table IV), the situation changed significantly. In this case, the force was sufficient to get the projectile out most of the time, but now applicant had an increased risk of seeing the chip bounce off the surface of the target, at least for the two smaller sizes. For the 0.24 cm$^3$ samples, the number of chips bouncing off was minor; here, the large amount of glue helped cushion the chip's impact on the surface. Due to the limited size of the mixing chamber, applicant was not able to investigate whether the improvement in our success rate continued for even larger amounts of glue. However, applicant expects to be able to use less glue with the automatic applicator he proposes for the second design, when he will have a more accurate control over the air pressure applied to the chip. The lack of reproducibility of the air gun is reflected in the fact that applicant had chips both bouncing off the target and getting stuck in the barrel under the same conditions. Of course, some of this effect may very well be due to variations in other parameters, such as the orientation of the chip with respect to the axis of the gun barrel or the precise amount of glue used. To account for these variations, an adaptive control of the air flow may be necessary in the automatic version of the applicator.

TABLE III

The efficiency of the first design MicroTAG applicator as a function of the amount of glue used. The air gun was pumped once between successive shots.

| Amount of Glue (cm³) | Number of Chips | | |
|---|---|---|---|
| | Sticking to Target | Not Out of Barrel | Bouncing off Target |
| 0.10 | 7 | 11 | 2 |
| 0.18 | 7 | 11 | 2 |
| 0.24 | 0 | 10 | 0 |

TABLE IV

The efficiency of the first design MicroTAG applicator as a function of the amount of glue used. The air gun was pumped twice between successive shots.

| Amount of Glue (cm³) | Number of Chips | | |
|---|---|---|---|
| | Sticking to Target | Not Out of Barrel | Bouncing off Target |
| 0.10 | 9 | 4 | 7 |
| 0.18 | 12 | 1 | 7 |
| 0.24 | 15 | 3 | 2 |

Next, applicant extended the tests for the large (0.24 cm³) sample to larger forces, pumping the air gun three times between successive shots. The result is shown in Table V, together with the corresponding results for one and two pumps. The marked increase in the number of chips bouncing off the target makes it obvious that the force obtained from pumping the air gun three times is too much for our purposes.

Finally, applicant tested the system as a function of the heater temperature. Using the optimal conditions determined in the previous measurements (0.24 cm³ of glue, two pumps of the air gun), applicant performed two additional series of test shots with a temperature of 142° C. and 178° C. respectively (the odd numbers are the result of changing the thermoelectric voltage measured by ±1 mV relative to the previous setting). The results for these tests are shown in Table VI, together with those for 160° C. Increasing and decreasing the temperature both led to a deterioration in the performance of the applicator. This can be understood by considering the viscosity of the glue as a function of temperature (cf. Table I above). At low temperature, the viscosity increases rapidly, making it more difficult to form a good bond between the glue and the chip in the time available (which was kept unchanged, at 15 s, throughout the three test series), negating the cushioning effect of the glue discussed above. In fact, at 142° C. applicant frequently observed that the two pieces of glue came out separately, from each other and the chip, and were still recognizable as small cylinders. The higher viscosity and resulting lower adhesiveness of the glue also explain why no samples got stuck in the barrel at this temperature. At 178° C., on the other hand, the viscosity of the glue was already so low that it tended to be blown off the chip and come out as a rather widely distributed "spray". Of course, this again made the glue unavailable as a "shock absorber". The results show that an accurate temperature control will be important for a reliable operation of the MicroTAG applicator.

TABLE V

The efficiency of the first design MicroTAG applicator as a function of the force applied in shooting out the glue and chip. This force is expressed in terms of the number of times the pump of the air gun was actuated between successive shots. The amount of glue used was 0.24 cm³.

| Number of Times Air Gun was Pumped | Number of Chips | | |
|---|---|---|---|
| | Sticking to Target | Not Out of Barrel | Bouncing off Target |
| 1 | 0 | 10 | 0 |
| 2 | 15 | 3 | 2 |
| 3 | 9 | 0 | 11 |

TABLE VI

The efficiency of the first design MicroTAG applicator as a function of the heater temperature. The amount of glue used was 0.24 cm³ the air gun was pumped twice between successive shots.

| Temperature (° C.) | Number of Chips | | |
|---|---|---|---|
| | Sticking to Target | Not Out of Barrel | Bouncing off Target |
| 142 | 8 | 0 | 12 |
| 160 | 15 | 3 | 2 |
| 178 | 10 | 4 | 6 |

Figure 16:
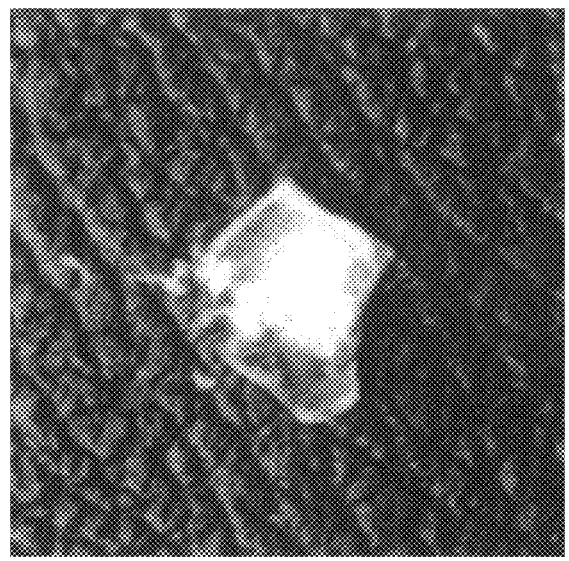
FIG. 16 shows a photograph of a copper chip imbedded in glue and applied onto a suitcase surface.

In summary, applicant has been able to reach an efficiency of 75% in applying our test chips to the test surface. In view of the known shortcomings of the design (such as the use of a low-cost off-the-shelf air gun), which were caused by the first design budget limitation due to the high cost of the prototype MicroTAG chip layout and fabrication and time constraints, applicant expects to increase the efficiency significantly for the proposed second design version of the applicator. Therefore, once the new automatic MicroTAG applicator is developed during the second design applicant expects to be able to optimize the applicator to approach 100% efficiency. A photograph of a copper chip embedded in the glue and applied onto a suitcase surface is shown in FIG. 16.

Powell, R. L., et al., "Thermocouple reference tables based on the IPTS-68" NBS monograph 125, 1974.

The design of the MicroTAG chip can be improved and optimized using the results described above. A second prototype should be manufactured. According to the results of the second prototype the final MicroTAG electronic circuit can be designed and a sufficient number of tags will be manufactured.

A prototype remote programmer/reader can also be designed and developed using the earlier design investigation results. The prototype manufactured can be delivered together with the tags. The applicator system can be finalized during the second design using the results obtained in the first design.

The first prototype smart MicroTAG chip developed during the first design work will be tested further during the second design study. The size of the new prototype tag chip to be developed during the second design will be smaller than the present prototype size, $4\times4\times0.3$ mm$^3$. The planned size is $3\times3\times0.1$ mm$^3$. The MicroTAG chip is designed to be completely self-contained. The prototype chip designed and fabricated during this project will contain connection pads for testing. The final chip to be manufactured at the end of the second design will not contain any connections pads to minimize its size. The new prototype MicroTAG chips developed during the second design will contain two antennas placed on opposite sides of the chip similar to the first prototype described above. One of them receives the microwave signal from the interrogator which is used for both to power the chip by storing charge onto a large on-chip capacitance bank and to transmit data to the chip. The second antenna is used to transmit the chip's response to any data requests from the interrogator. Rather than using an (power-intensive) active transmitter for this purpose, this antenna is set up in the first design to reflect a continuous wave from the interrogator with varying efficiency; the data from the chip is encoded in the pattern of the efficiency variation. For details of this "modulated backscatter" design see the discussion in the section Remote Power Deposition on the MicroTAG Chip. For the second design applicant plans to use the same principle, although applicant will likely have to add spread-spectrum techniques in the final design to increase the noise immunity of the system.

The MicroTAG chip fabrication process to be used for the final product is expected to be about 0.25 to 0.8 micron to achieve small size and low power design. For example, a 0.25 micron process requires only 1.8 V for the digital circuitry. However, the first design prototypes were manufactured using a 1.2 micron process. Initial second design prototypes may also be manufactured using a larger minimum line width process such as 1.2, 0.8 or 0.5 micron.

A computer aided design (CAD) program developed for modeling and simulating electromagnetic devices used during the first design is also expected to be used during the second design. This program is especially useful to design, simulate, and optimize the receiving and transmission antennas. In this work the spacing and thickness of the antenna metal will be optimized for application to the proposed smart MicroTAG chip. The test results obtained from the first prototype version will be used during the second design to fully optimize the MicroTAG chip design.

The external remote programmer/reader will send out radio frequency power to the antenna on the chip. The received power will be used to charge up a capacitor. The output of the capacitor will then be used to power the chip. The rest of the circuit on the chip will be low power CMOS circuits that will receive the signal from the remote programmer/reader and store the information in the non-volatile memory. If a read request comes from the programmer/reader, the chip will also have the functionality to transmit the contents of the memory through the antenna. Details of the digital circuitry are discussed in the section Remote Power Deposition onto the MicroTAG Chip, found above.

Other functions such as having a unique MicroTAG number for identification of which MicroTAG is programmed or read out will also be studied and implemented if required. Such a unique identification number can be important if there is more than one MicroTAG inside the aperture field of the remote programmer/reader.

The cost of the chip will be kept as low as possible by using small die size on large 6", 8" or 12" wafers. For example, from a single 8" wafer applicant expects to get approximately 10,000 $2\times2$ mm$^2$, 3,000 $3\times3$ mm$^2$, and 2,000 $4\times4$ mm$^2$ dies. Small dies with relatively simple circuitry may have exceptionally high yield reaching up to 80%. In large quantities each wafer is expected to cost much less than $400 to process. This shows that even with 50% yield at $400 per wafer and for the largest die size considered, i.e., in a worst-case scenario, the fabrication cost of the tags is no more than 40 cents per chip. If the smallest die size is used then the cost can be easily few cents per die. Recently, 12" wafers are becoming available which can reduce the cost even further. The cost of the initial prototypes will be much higher due to the low numbers required and the large non-recurring engineering cost which includes the design, layout, simulations and the mask set.

A second factor involved in the cost is the selection of the working tags for deployment. Since the production tags will be completely self-contained, the testing will not require a probe card and a costly probe station. The dies can be placed onto a conveyor belt passing in front of a test and selection system. The test system will be similar in design to the remote programmer/reader unit. It will be programmed to power the tag, write and read several coded data to test and select the working chips. These tests can be fully automated, further reducing the cost. Such a quality control system can be built by applicant during a later design. It may also program a unique ID number onto the MicroTAG chip if required. In fact, the complexity of the chip and hence the cost of the system could be reduced significantly by limiting the information stored on the chip to this unique ID number and storing all other relevant data associated with that ID on a stationary computer system connected to the interrogator. As an added benefit, this simplified solution would greatly reduce potential problems stemming from unauthorized access to the data on discarded chips; without simultaneous access to the "stationary" data, the ID numbers on the chips would be meaningless. On the down side, this solution would require a bigger range of ID numbers, since those numbers would now have to distinguish all the records stored in the computer system at any given time, rather than just minimizing the chance of having two chips with the same ID in the field of view of an interrogator.

Some aspects of the proposed MicroTAG chip design were too complex for a full investigation within the scope of the first design. One option that will be studied in more detail is to use GaAs rather than CMOS technology. This would definitely improve the chip's microwave capabilities, but it remains to be investigated whether these improvements justify the increased cost. Other issues that will be resolved during the second design are discussed in the following subsections.

Antenna Circuit for the Smart MicroTAG

One of the most important sections of the proposed MicroTAG chip is the antenna circuit. It will be designed to receive the maximum possible power from the remote programmer/reader and store it onto a capacitor for use by the MicroTAG chip for receiving signals, decoding and storing the data into memory, and transmitting data back to the remote reader. In the current chip design (the first design), it is executed as a simple patch antenna. Other antenna types such as dipole, half wave, quarter wave, etc. will be carefully studied and simulated. Each antenna type has its own benefits and problems. The simulations will help the selection of the best antenna type for the proposed system.

Figure 17:
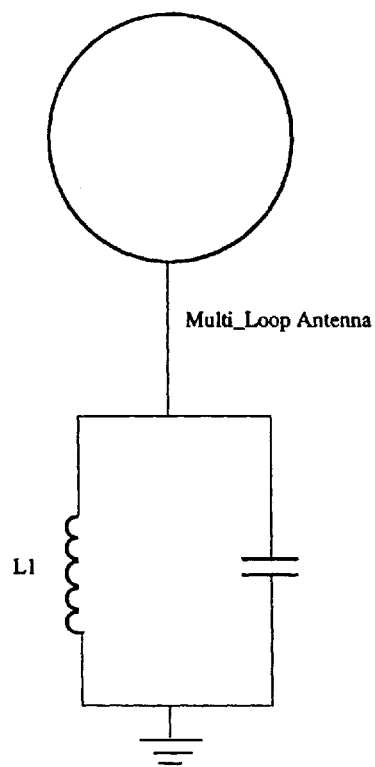
FIG. 17 shows a parallel tuned antenna circuit.

Alternatively, the receiver circuit may be formed from a closed loop antenna with several turns running around the perimeter of the integrated circuit. The antenna will be attached to a parallel LC tank circuit (FIG. 17). This circuit forms its highest impedance at the resonant frequency of the LC tank circuit so the transmission/receiver wavelength will be set to this frequency.

Antenna placement onto the MicroTAG chip may have a lot of potential problems that must be avoided. One of these is the width of the antenna line. It must be carefully optimized as the adjacent layers can be electrically shorted to form a single line. The thickness and width of the antenna line should also be kept as large as possible. Since the aim is also to produce the smallest chip area, a compromise must be made that will work. Three dimensional simulations of the antenna system will be used to accomplish this.

The efficiency of a loop antenna is related to the loop radius as the fourth power and the induced current squared as given in the formula below.

Transmitting through a Small Circuit Loop Antenna

The power radiated from a loop antenna can be obtained (Ramo, Whinnery and Van Duzer, 1965) by integrating the time averaged Poynting vector, $$\overline{P} = \overline{E} \times \overline{H}$$

which is the power density at any point. In spherical coordinates, the total power radiated is $$W = \int_0^X \int_0^{2X} P_r r^2 \sin\theta d\theta d\Phi = \int_0^X \int_0^{2X} K \sin\theta d\theta d\Phi,$$

where $P_r$ is the radial component of the Poynting vector and K is defined as the radiation intensity.

For a loop antenna, K is obtained as $$K = \frac{\eta}{8\lambda^2} k^2 \pi^2 a^4 I^2 \sin^2\theta = \frac{\eta}{32}(ka)^4 I^2 \sin^2\theta$$

The power radiated by the loop antenna is $$W = 2\pi \int K \sin\theta d\theta = \frac{\pi\eta}{12}(ka)^4 I^2 \quad (1)$$

where a is the radius of the loop, η comes from the impedance of media, and k is the wave constant.

EEPROM Memory Organization

Figure 18:
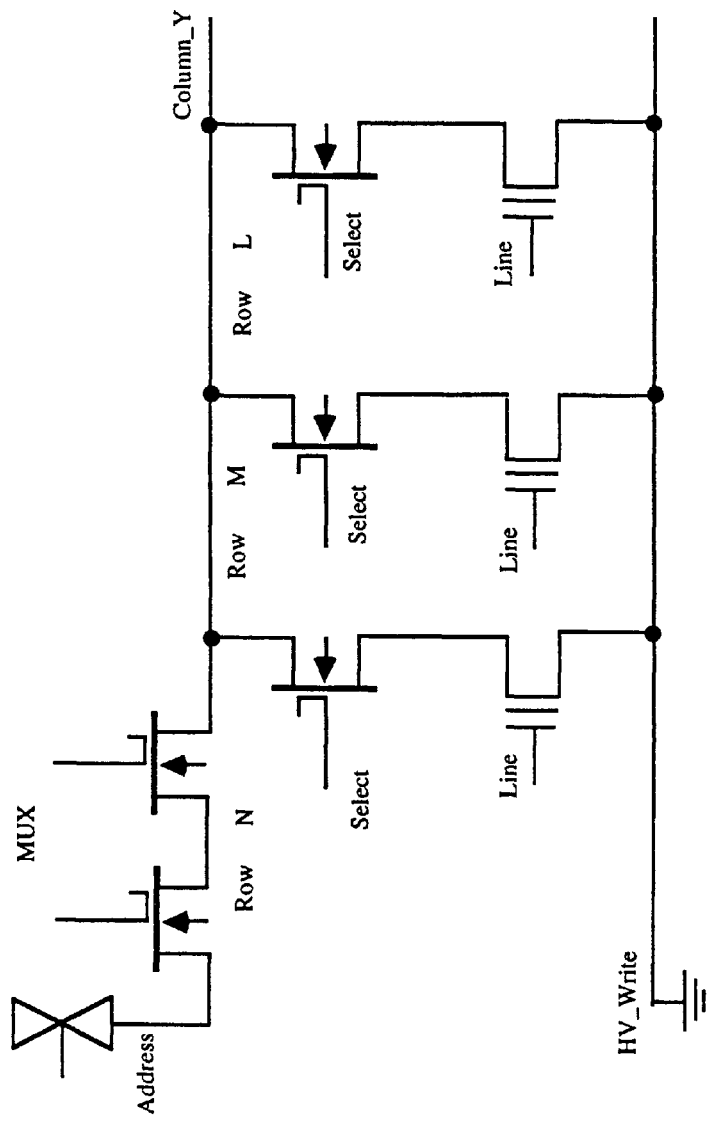
FIG. 18 shows a EEPROM memory circuit (one cell).

The EEPROM memory is organized to read and write under the address control. A single cell of a core memory is shown in FIG. 18. The EEPROM cells are MOSFETs with the extra floating gate controlled by the ROW LINE. In write operation the appropriate column is selected by the column multiplexer. After selection the row line is pulsed to erase all the cells to zero. A one can be written to the appropriate cell by selection of the row select line. The high voltage switch is enabled and a high level signal is applied to the drain of the MOSFET selected for write. The high voltage can be generated by a circuit similar to the one shown in FIG. 8. The MOSFET stores a one when it is selected. In read operation the cell is addressed by the row and column registers. Each column will be high corresponding to a stored zero and low corresponding to a stored one. The sense amplifier and logic creates the correct output sense for positive logic.

MicroTAG Chip Remote Programmer/Reader

The remote programmer/reader for the MicroTAG chip will have to perform three basic tasks:

1. Power up the chip by transmitting microwave power to it which, after rectification, will be stored on the on-chip capacitor array to provide a constant supply for the duration of the data exchange between chip and interrogator.

2. Transmit data to the chip. These data can either contain information to be written to the on-chip memory or consist of a request to the chip to transmit all or part of its memory contents back to the interrogator.

3. Receive data from the chip. With the current concept for data transmission from the chip, this task will consist of two parts, sending out a carrier wave and receiving the modulated backscatter of that wave.

Any transmission to or from the chip will require high frequency microwaves to achieve an acceptable degree of efficiency, due to the small size of the MicroTAG chip and of any antennas that can be placed on it. While the current chip design was made for a frequency of 10 GHz, applicant may use slightly higher frequencies in the final version of the MicroTAG chip.

Figure 19:
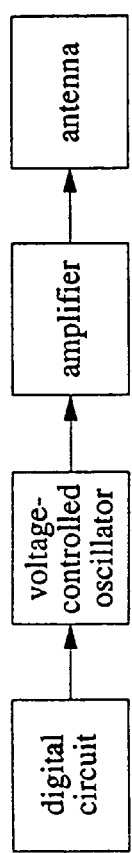
FIG. 19 is a block diagram of a circuit for frequency-modulated data transmission.

The current concept for data transmission to the chip calls for a frequency modulation of the carrier wave with one of two frequencies, with the pattern of the modulation representing the data to be transmitted. The principal design of a transmitter that could generate such a signal is straightforward; it is shown in FIG. 19. A digital circuit produces the pattern to be transmitted, which, at this stage, is represented by two different voltage levels. These levels are used to tune a voltage-controlled oscillator whose output is amplified and transmitted to the chip through a suitable antenna.

When transmitting data from the chip to the interrogator, the information will again be encoded in a pattern formed by modulating the carrier wave with two different frequencies. In this case, our present concept, realized in the first design version of the MicroTAG circuit, calls for chopping the reflected wave with the respective frequency. On the receiver side, the incoming signal will then be sent through a filter that detects only the slow variation of the signal, but not the high carrier frequency. This will be followed by a pair of high- and low-pass filters, tuned midway between the two modulation frequencies, and suitable logic circuitry to decode the pattern sent by the chip.

Special attention will have to be paid to the design of the antennas used by the interrogator to transmit and receive data and power, particularly their directional characteristics. On one hand, applicant wants the transmission to be as efficient as possible, which would imply a strongly focussed beam. On the other hand, the position of the chip passing by the programmer/reader is not known a priori, so the system's aperture has to be large enough to guarantee that the communication can be established. Obviously, a compromise will have to be found between these two conflicting requirements.

In summary, the remote programmer/reader will produce microwaves tuned to the MicroTAG antenna for transferring power to the chip. It will also transmit data and/or an identification number to the MicroTAG chip. The identification number can be already programmed into the MicroTAG chip before application. The remote programmer/reader will also have the capability to ask the chip to send its memory contents and be able to read the data transmitted by the tag. Each cycle: send power, send data or request for data to tag, and read tag, will be done sequentially.

The cost of the remote programmer/reader will largely depend on the microwave power required and, to a lesser degree, on the frequency applicant will use. Another important factor is whether it will be possible to use the same transmitter both for the actual data transmission to the chip and to generate the carrier wave for the modulated backscatter, or whether applicant will have to use separate devices for the two tasks. Consequently, it is difficult to give a reliable estimate for the eventual production cost of this device, but applicant may reasonably expect production costs to be below $3,000.

MicroTAG Chip Applicator

Applicant proposes a simple but novel technique to meet these requirements. The proposed applicator will be made of a simple glue gun. A jelly type of glue that does not harden but retains its adhesive quality for a long period of time measured in days will be used; a suitable candidate has been identified during the first design (cf. section MicroTAG Chip Application System). The tags will be embedded into the glue, and glue balls containing a MicroTAG chip will be propelled onto a piece of baggage. The diameter of the glue ball will be between 3 and 5 mm. This type of glue practically attaches itself to any known material. The only problematic surfaces may be oily surfaces and possibly teflon. Please note that the MicroTAG can be used with other type of applicators or without an applicator placed in any type of environment.

The process of applying a MicroTAG chip to a given piece of baggage can be broken up into several steps:

1. Melt the glue and insert it into the mixing chamber. For an automated system, this is likely to be the order required to guarantee that the same amount of glue is used each time. Apart from this consideration, though, there is nothing that would require this particular order of events, rather than melting the glue only after it reaches the mixing chamber. This latter method might in fact be advantageous if it is intended to use prefabricated glue-chip pellets, instead of mixing the two components in situ as discussed in step 2.

2. Insert the chip into the mixing chamber with the liquid glue. The glue temperature should be adjusted such that its viscosity allows the chip to sink to the center of the drop of glue in the time available. This will result in the best chance for the chip to stay with the glue during the shooting process. Alternatively, the same goal can be achieved by inserting the chip between two layers of glue with correspondingly higher viscosity. A relatively high viscosity also helps ensure that the glue is not "blown off" the chip by the air used to shoot the glue-chip combination onto the baggage.

3. Move the glue-chip combination to the barrel of the air "gun" used to shoot it out. There are two reasons why this is more advantageous than mixing glue and chip directly in the barrel. The first is that depending on various parameters the time required to heat the glue and bring it in good contact with the chip may be longer than the separation between successive pieces of baggage. In this case using several mixing chambers that successively move into the same barrel will be easier and more economical than having several barrels, each with its own valves and feeding system for glue and chips. Secondly, moving the glue-chip pellet into the barrel just in time prevents it from dropping out prematurely under its own weight.

4. Shoot the glue-chip pellet onto the object passing by under the barrel. While applicant uses the term "shoot" here, our first design tests (discussed above) indicate that this is not the optimal way to propel the chip onto its target. "Shooting" implies a short, explosive burst of air; that makes it hard to keep the proper balance between applying enough force to get the pellet out of the barrel and avoiding to shoot it out so violently that the chip bounces off the surface it hits. A longer-lasting, continuous, and preferably adjustable stream of air is expected to lead to a significantly better performance in this respect.

5. Remove any glue residue from the barrel to keep the system from clogging up and avoid uncontrolled dripping of glue.

Figure 20:
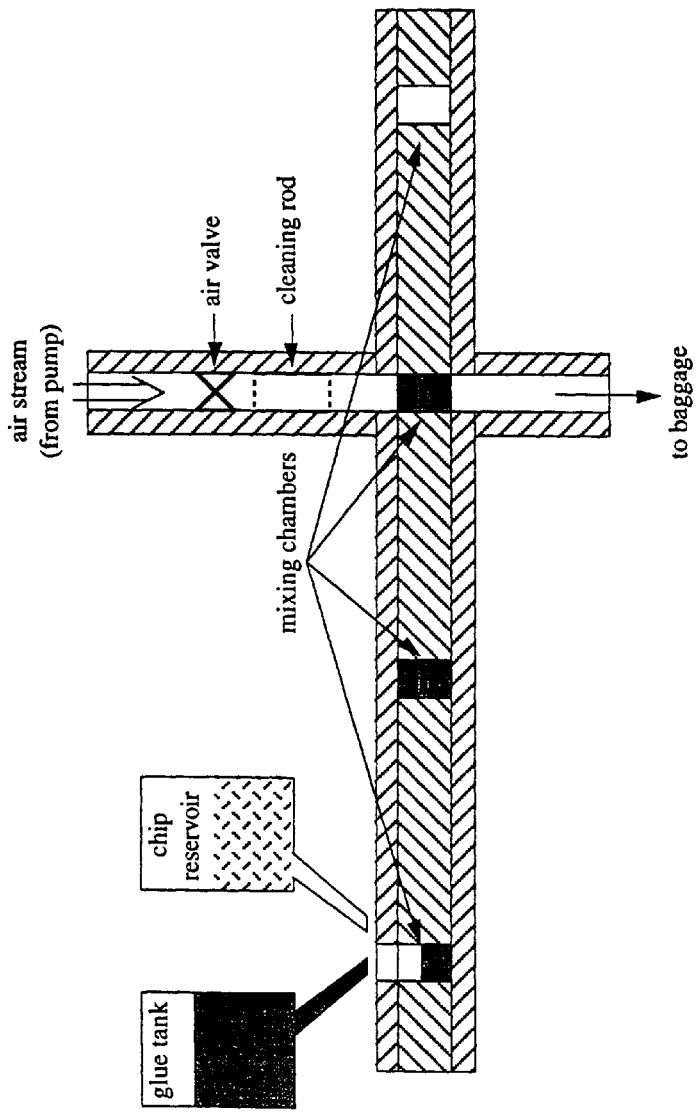
FIG. 20 is a design of a MicroTAG applicator.

These steps are realized in the conceptual design shown in FIG. 20. The glue is stored in a tank, from where it flows through a suitable valve into a mixing chamber. It remains to be investigated whether an active pump mechanism is needed in order to accomplish this. The chips can either be transported to the mixing chamber by a tape conveyor system, similar to those used for transporting surface-mount components, or be stored in a container above the mixing chamber, with a suitable mechanism to reliably get out individual chips. The latter option is shown in FIG. 20. The filled mixing chamber then moves on to the right, towards the barrel of the air gun. When the chamber with the glue-chip pellet reaches the barrel and a piece of baggage arrives below it, the air valve opens just long enough for the air stream to flush out the projectile onto the target. After each "shot" the barrel will have to be cleaned from glue residue to avoid clogging and accidental spillage. The cleaning rod indicated in FIG. 20, which would move down the barrel to scrape the glue off the walls is only one of the options applicant is considering; details will have to be investigated during the second design of the project. One important element of the MicroTAG applicator that is not shown in FIG. 20 is the heating system. Any part of the applicator that can come in contact with the glue will have to be heated to the correct application temperature to keep the pellets from sticking to the walls. It remains to be investigated in the second design whether preheating the pressurized air will lead to a big enough improvement in the system's performance to justify this measure to baggage Integrating the MicroTAG Chip Applicator into Applicant's Automated Baggage Inspection System (ABIS)

Figure 21:
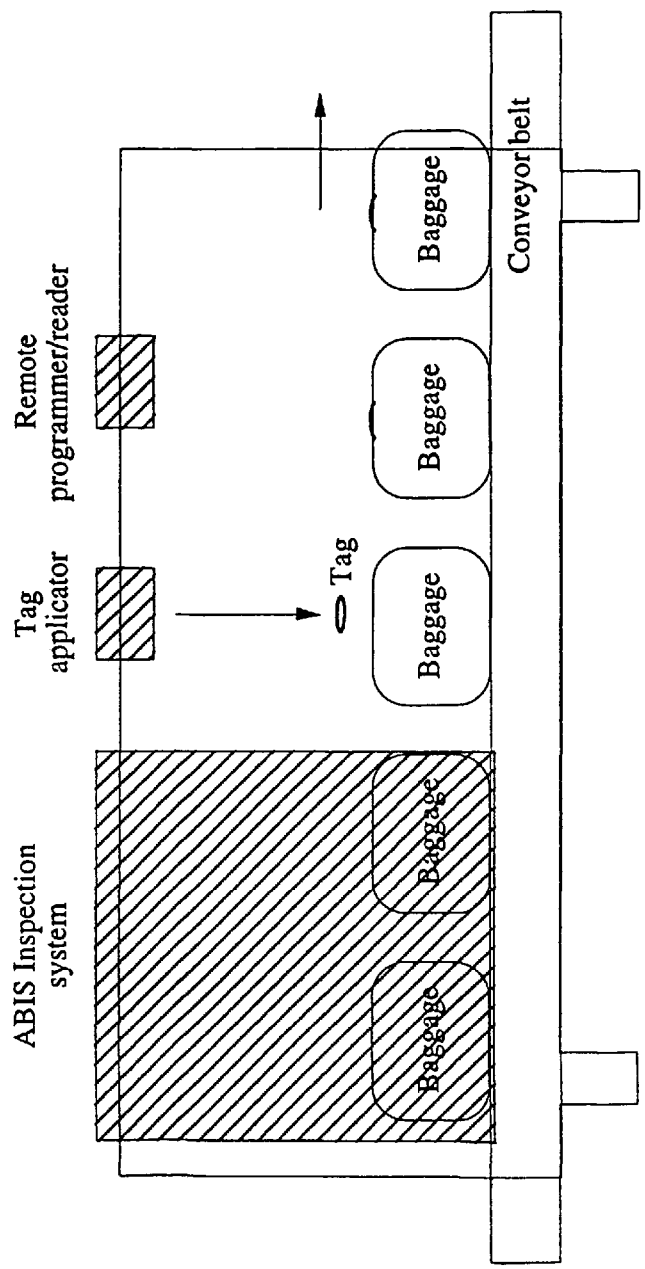
FIG. 21 is a schematic drawing of an integrated baggage inspection and tagging system.

If it is intended to tag only those baggage items which trigger a baggage inspection system, for example the ABIS system currently being developed at NOVA, and ARDEC it will be necessary to integrate both the MicroTAG applicator and a remote programmer/reader into that system. To achieve this, applicant plans to place a MicroTAG applicator on the same conveyor belt as the ABIS inspection system, down the line from the latter. This is shown schematically in FIG. 21. Upon detection of suspicious items, the ABIS system will send a signal to the MicroTAG applicator, causing it to shoot a MicroTAG chip onto the piece of baggage in question. The distance between the x-ray system and the applicator will obviously depend on the time it takes to reach a decision and prepare the chip for application, and on the maximum speed of the conveyor belt. If it is possible to keep the glue at the application temperature with a chip embedded for an extended time without affecting the reliability of the system, then applicant will be able to quickly deploy a chip and place the components correspondingly closer together. To adjust for varying conveyor velocities, applicant can either couple the timing of the applicator to the speed readout from the conveyor or place suitable tags on the conveyor belt itself at close intervals and have them read (and matched) by both the ABIS system and the applicator. To ensure that the MicroTAG chip actually hits the baggage item, applicant may have to adjust the lateral position or aiming direction of the applicator; the position of the item can be deduced from its x-ray image.

Immediately after it has been applied, the MicroTAG chip can be programmed and/or its ID number read by the remote programmer/reader and linked in the system's computer with the result of the inspection by the ABIS system. This also serves to verify that the chip has actually landed on the baggage as intended. Obviously, any preparation time for the programmer/reader will be much less than that for the applicator, so the two can be placed right next to one another.

COMMERCIAL APPLICATIONS

Potential commercial application of a smart versatile tag is self evident and extremely good. It can be applied to monitoring, tracking, searching, labeling, personalizing, selecting, and finding items that belong to a large group. Due to the low production cost, the proposed radio frequency smart tags can be used to tag a large number of items without need to recover them. They can also be used in smart card type systems where access to the card can be done remotely. Potential civilian uses of the smart tags include: tagging luggage, bags, boxes in airports; monitoring parcels, packages, crates, and individual items during transport; identifying employees and vehicles; labeling and searching folders, files, and dockets; personalizing and recording information on smart cards; tracking inventory; and monitoring merchandise. Of course, some of these applications will require modifications to the system, such as using different ways to apply the chips and developing hand-held programmers/readers. These modifications are minor, though, and in view of the large potential market for the associated applications, they should be well worth the additional development effort.

FEDERAL GOVERNMENT USE

The proposed radio frequency or microwave smart tags and applicator can be used for military and other government applications. These applications will be quite similar to the applications listed above. One of the first application could be the Automatic Baggage Inspection System (ABIS) under development for ARDEC, USDA and FAA. Some other possible military applications include tagging individual weapons, munitions, pieces of equipment, crates, hazardous materials and other inventory.

The invention claimed is:

1. A tag comprising a single integrated circuit chip that includes:
a first receiving antenna that receives an electromagnetic wave;
a signal receiving system that receives and stores input data derived from the wave;
a converter system that receives the wave and converts the wave to an electric charge;
a separate power storage component that receives and stores the electric charge to use the charge to power the integrated circuit; and
a data processing system that produces output data from the input data;
a circuit that sends at least a portion of the output data to a second transmission antenna;
wherein the second antenna transmits at least a portion of the output data externally to the tag.

2. The tag of claim 1, wherein the wave has a wavelength within a spectrum of the wavelengths from radio waves to ultraviolet light, inclusive.

3. The tag of claim 1, further comprising a memory section that stores at least a portion of the input data and at least a portion of the output data.

4. The tag of claim 3, wherein the memory section is nonvolatile.

5. The tag of claim 1, further comprising a multiplexer that controls flow of the input data.

6. The tag of claim 1, further comprising a pulse generating circuit.

7. The tag of claim 1, wherein the input data is in analog form.

8. The tag of claim 1, wherein the input data is in digital form.

9. The tag of claim 1, wherein the output data is in analog form.

10. The tag of claim 1, wherein the output data is in digital form.

11. The tag of claim 1, further comprising a clock generator circuit.

12. The tag of claim 1, further comprising a shift register circuit.

13. The tag of claim 1, wherein the transmission antenna is selected from the group consisting of a backscatter, a dipole, half wave, a quarter wave, and a closed loop type antenna.

14. The tag of claim 1, wherein the integrated circuit is built onto material that includes a composition selected from the group consisting of silicone, germanium, GaAs, sapphire, and diamond.

15. The tag of claim 1, further comprising test and monitoring points and pads.

16. The tag of claim 1, further comprising a test and monitoring control circuitry.

17. The tag of claim 1, further comprising circuits selected from a group of circuits including logic, sequencing and switching.

18. The tag of claim 1, wherein the receiving antenna comprises an antenna selected from the group consisting of a dipole, a half wave, a quarter wave, and a closed loop antenna.

19. The tag of claim 1, wherein the transmission antenna comprises a dipole antenna.

20. The tag of claim 19, wherein the transmission antenna is powered entirely by the energy stored by the power storage component.

21. The tag of claim 19, wherein the transmission antenna is a backscatter type antenna.

22. The tag according to claim 1, wherein the receiving antenna is tuned to a frequency from radio waves to ultra violet, inclusive.

23. The tag of claim 1 wherein the integrated circuit is monolithic, the receiving antenna supplies power to both the integrated circuit and the transmission antenna, and further comprising a memory that stores at least a portion of the input data and at least a portion of the output data.

24. The tag of claim 1, further comprising a data processing system that processes the input data and produces at least one decision and takes at least one action.

25. The tag of claim 1, wherein the driver circuit drives the transmission antenna selected from a group including full wave, half-wave and quarter-wave reflectors.

26. The tag of claim 1, wherein the receiving antenna comprises a loop antenna.

27. The tag of claim 1, wherein the transmission antenna comprises a loop antenna.

28. The tag of claim 1, wherein the receiving antenna comprises a single pole antenna.

29. The tag of claim 1, wherein the transmission antenna comprises a single pole antenna.

30. A tag comprising a single integrated circuit chip that includes:
an antenna that receives an electromagnetic wave;
a converter system that receives the wave and converts the wave to an electric charge;

a separate power storage component that receives and stores the electric charge to use the charge to power the integrated circuit;

a data processing system that produces output data; and transmission electronics that transmits at least a portion of the output data externally to the tag using the antenna.

31. The tag of claim 30, wherein the wave has a wavelength within a spectrum of the wavelengths from radio waves to ultraviolet light.

32. The tag of claim 30, further comprising a memory section that stores at least a portion of the output data.

33. The tag of claim 32, wherein the memory section is a nonvolatile memory.

34. The tag of claim 30, further comprising a multiplexer that controls flow of the output data.

35. The tag of claim 30, further comprising a pulse generating circuit.

36. The tag of claim 30, further comprising a circuit circuitry that receives input data in analog form.

37. The tag of claim 36, wherein the input data is in digital form.

38. The tag of claim 30, wherein the output data is in analog form.

39. The tag of claim 30, wherein the output data is in digital form.

40. The tag of claim 30, further comprising a clock generator circuit.

41. The tag of claim 30, further comprising a shift register circuit.

42. The tag of claim 30, wherein the integrated circuit is built onto a substrate that includes a material selected from the group consisting of silicone, germanium, GaAs, sapphire, and or diamond.

43. The tag of claim 30, further comprising test and monitoring points and pads.

44. The tag of claim 30, further comprising test and monitoring control circuitry.

45. The tag of claim 30, further comprising circuits selected from a group of circuits including logic, sequencing and switching.

46. The tag according to claim 30, wherein the transmission antenna is tuned to a frequency from radio waves to ultra violet, inclusive.

47. The tag of claim 30 wherein the integrated circuit is monolithic, the receiving antenna supplies power to the integrated circuit, and further comprising a memory that stores at least a portion of the input data and at least a portion of the output data.

48. The tag of claim 30, further comprising a data processing system that processes the input data and produces at least one decision and takes at least one action.

49. The tag of claim 30, wherein the receiving antenna comprises a single pole antenna.

50. The tag of claim 30, wherein the receiving antenna comprises a loop antenna.

51. The tag of claim 30, wherein the receiving antenna is a dipole type antenna.

52. The tag of claim 51, wherein the receiving antenna is a backscatter type antenna.

53. A method of making a tag comprising a single integrated circuit chip that includes:

receiving an electromagnetic wave using a receiving antenna;

storing an input data that is derived from the wave;

converting the wave received to charge;

storing the charge to use the charge to power the integrated circuit;

producing an output data from at least a portion of the input data;

sending at least a portion of the output data to a second transmission antenna; and transmitting at least a portion of the output data externally to the tag.

54. The tag of claim 53, wherein the wave has a wavelength within a spectrum of the wavelengths from radio waves to ultraviolet light.

55. The tag of claim 53, wherein the receiving antenna is selected from the group consisting of a dipole, a backscatter, a half wave, and a quarter wave antenna.

56. The tag of claim 53, wherein the receiving antenna comprises a loop antenna.

57. The tag of claim 53, further comprising a memory section that stores at least a portion of the input data.

58. The tag of claim 57, wherein the memory section is nonvolatile.

59. The tag of claim 53, further comprising a tuning circuit that tunes the receiving antenna to receive the wave at a frequency selected from a range from waves to ultraviolet.

60. The tag of claim 53, further comprising a multiplexer that controls flow of the input data.

61. The tag of claim 53, further comprising a pulse generating circuit.

62. The tag of claim 53, further comprising a circuit that receives input data in analog form.

63. The tag of claim 53, wherein the input data is in digital form.

64. The tag of claim 53, wherein the output data is in analog form.

65. The tag of claim 53, wherein the output data is in digital form.

66. The tag of claim 53, further comprising a clock generator circuit.

67. The tag of claim 53, further comprising a shift register circuit.

68. The tag of claim 53, further comprising a data processing system that processes the input data and produces at least one decision and takes at least one action.

69. The tag of claim 53, wherein the integrated circuit utilizes a substrate that includes a material selected from the group consisting of silicone, germanium, GaAs, sapphire and diamond.

70. The tag of claim 53, further comprising test and monitoring points and pads.

71. The tag of claim 53, further comprising test and monitoring control circuitry.

72. The tag of claim 53, further comprising circuits selected from the group of circuits consisting of logic, sequencing, and switching circuits.

73. The tag of claim 53, wherein the receiving antenna comprises a single pole antenna.

* * * * *